USO11805262B2

(12) United States Patent
Yamori

(10) Patent No.: US 11,805,262 B2
(45) Date of Patent: *Oct. 31, 2023

(54) IMAGE ENCODING DEVICE, IMAGE DECODING DEVICE, AND IMAGE PROCESSING METHOD

(71) Applicant: FUJITSU LIMITED, Kawasaki (JP)

(72) Inventor: Akihiro Yamori, Kawasaki (JP)

(73) Assignee: FUJITSU LIMITED, Kawasaki (JP)

(*) Notice: Subject to any disclaimer, the term of this patent is extended or adjusted under 35 U.S.C. 154(b) by 0 days.

This patent is subject to a terminal disclaimer.

(21) Appl. No.: 17/671,221

(22) Filed: Feb. 14, 2022

(65) Prior Publication Data

US 2022/0166988 A1 May 26, 2022

Related U.S. Application Data

(62) Division of application No. 17/099,941, filed on Nov. 17, 2020, now Pat. No. 11,284,087, which is a
(Continued)

(30) Foreign Application Priority Data

Aug. 23, 2017 (JP) .................................. 2017-159965

(51) Int. Cl.
H04N 19/105 (2014.01)
H04N 19/159 (2014.01)
(Continued)

(52) U.S. Cl.
CPC ......... *H04N 19/159* (2014.11); *H04N 19/105* (2014.11); *H04N 19/11* (2014.11);
(Continued)

(58) Field of Classification Search
None
See application file for complete search history.

(56) References Cited

U.S. PATENT DOCUMENTS 9,602,839 B2  3/2017 Li et al.
10,666,952 B2  5/2020 Yamori
(Continued)

FOREIGN PATENT DOCUMENTS

JP  2016-27756   2/2016
JP  2020-503785  1/2020
(Continued)

OTHER PUBLICATIONS

Decision of Refusal dated Mar. 22, 2022 for Japanese Patent Application No. 2017-159965.
(Continued)

*Primary Examiner* — Christopher G Findley
(74) *Attorney, Agent, or Firm* — STAAS & HALSEY LLP

(57) ABSTRACT

An image encoding device is provided that performs, in an image, an intra-prediction on a block obtained by dividing the image so as to encode the block, the image encoding device including: a memory; and a processor coupled to the memory and the processor configured to select a rectangular block as the block, and to add a certain prediction direction as a selection target intra-prediction direction when the rectangular block is selected, wherein the certain prediction direction is one of prediction directions in which a pixel that is adjacent to a short side of the rectangular block is referred to, and an adjacent pixel in a left or upper block that is adjacent to a long side of the rectangular block is referred to in another prediction direction that is 180 degrees opposite to the certain prediction direction.

7 Claims, 11 Drawing Sheets

Related U.S. Application Data division of application No. 16/847,381, filed on Apr. 13, 2020, now Pat. No. 10,979,719, which is a division of application No. 16/059,448, filed on Aug. 9, 2018, now Pat. No. 10,666,952.

(51) Int. Cl.

| | | |
|---|---|---|
| *H04N 19/593* | (2014.01) | |
| *H04N 19/11* | (2014.01) | |
| *H04N 19/70* | (2014.01) | |
| *H04N 19/176* | (2014.01) | |
| *H04N 19/136* | (2014.01) | |
| *H04N 19/182* | (2014.01) | |

(52) U.S. Cl.
CPC ......... *H04N 19/136* (2014.11); *H04N 19/176* (2014.11); *H04N 19/182* (2014.11); *H04N 19/593* (2014.11); *H04N 19/70* (2014.11)

(56) References Cited

U.S. PATENT DOCUMENTS

| | | | |
|---|---|---|---|
| 10,979,719 | B2 | 4/2021 | Yamori |
| 11,284,087 | B2* | 3/2022 | Yamori ............... H04N 19/136 |
| 2012/0307894 | A1 | 12/2012 | Chien et al. |
| 2013/0034154 | A1 | 2/2013 | Song et al. |
| 2013/0315303 | A1 | 11/2013 | Min et al. |
| 2014/0247876 | A1 | 9/2014 | Moriya et al. |
| 2015/0110174 | A1 | 4/2015 | Gu et al. |
| 2015/0245021 | A1 | 8/2015 | Matsuo et al. |
| 2016/0345011 | A1 | 11/2016 | Naing et al. |
| 2018/0139443 | A1 | 5/2018 | Park et al. |
| 2018/0288413 | A1 | 10/2018 | Filippov et al. |
| 2018/0302620 | A1 | 10/2018 | Koo et al. |
| 2019/0158846 | A1 | 5/2019 | Moon et al. |
| 2019/0208201 | A1 | 7/2019 | Yasugi et al. |

FOREIGN PATENT DOCUMENTS

| | | |
|---|---|---|
| JP | 2020-182248 | 11/2020 |
| JP | 2020-182249 | 11/2020 |
| WO | 2012/009540 A1 | 1/2012 |
| WO | 2014/110568 A1 | 7/2014 |
| WO | 2017/144017 A1 | 8/2017 |
| WO | 2018/117892 A1 | 6/2018 |
| WO | 2018/127624 A1 | 7/2018 |

OTHER PUBLICATIONS

Decision of Refusal dated Mar. 22, 2022 for Japanese Patent Application No. 2020-128779.
Decision of Refusal dated Mar. 22, 2022 for Japanese Patent Application No. 2020-128780.
Decision of Refusal dated Mar. 22, 2022 for Japanese Patent Application No. 2020-128781.
Decision of Dismissal of Amendment dated Mar. 22, 2022 for Japanese Patent Application No. 2017-159965.
Decision of Dismissal of Amendment dated Mar. 22, 2022 for Japanese Patent Application No. 2020-128779.
Decision of Dismissal of Amendment dated Mar. 22, 2022 for Japanese Patent Application No. 2020-128780.
Decision of Dismissal of Amendment dated Mar. 22, 2022 for Japanese Patent Application No. 2020-128781.
Extended European Search Report for European Application No. 18188459.4 dated Oct. 30, 2018, 11 pp.
Auwera, et al.; "Description of Core Experiment 3: Intra Prediction and Mode Coding", 10$^{th}$ JVET Meeting: 10-1 Joint Video Experts Team of ITU-T SG 16 WP 3 and ISO/IEC JTC 1/SC 29/WG 11, JVET-J1023. pp. 1-44.
U.S. Notice of Allowance dated Oct. 4, 2019 from U.S. Appl. No. 16/059,448.
U.S. Notice of Allowance dated Jan. 16, 2020 from U.S. Appl. No. 16/059,448.
U.S. Office Action dated Sep. 4, 2020 from U.S. Appl. No. 16/845,900, 13 pages.
U.S. Office Action dated Sep. 4, 2020 from U.S. Appl. No. 16/847,381, 13 pages.
Notice of Allowance dated Nov. 30, 2020 from U.S. Appl. No. 16/845,900.
U.S. Notice of Allowance dated Jan. 8, 2021 from U.S. Appl. No. 16/847,381.
U.S. Office Action dated Oct. 26, 2021 from U.S. Appl. No. 17/099,941.
U.S. Notice of Allowance dated Nov. 16, 2021 from U.S. Appl. No. 17/099,941.
European Office Action dated Jan. 25, 2021 from European Application No. 18188459.4, 4 pages.
Japanese Office Action dated May 25, 2021 from Japanese Application No. 2020-128781, 6 pp.
Japanese Office Action dated May 25, 2021 from Japanese Application No. 2017-159965, 6 pp.
Japanese Office Action dated May 25, 2021 from Japanese Application No. 2020-128780, 6 pp.
Notice regarding equivalent applications filed on same date by same applicant in Japanese Application No. 2020-128781, May 25, 2021, 2 pp.
Japanese Office Action dated May 25, 2021 from Japanese Application No. 2020-128779, 6 pp.
Notice regarding equivalent applications filed on same date by same applicant in Japanese Application No. 2020-128780, dated May 25, 2021, 2 pp.
Japanese Office Action dated Oct. 19, 2021 in corresponding Japanese Patent Application No. 2017-159965.
Japanese Office Action dated Oct. 19, 2021 in corresponding Japanese Patent Application No. 2020-128779.
Japanese Office Action dated Oct. 19, 2021 in corresponding Japanese Patent Application No. 2020-128780.
Japanese Office Action dated Oct. 19, 2021 in corresponding Japanese Patent Application No. 2020-128781.
U.S. Corrected Notice of Allowability dated Dec. 15, 2021 from U.S. Appl. No. 17/099,941.
U.S. Appl. No. 17/099,941, filed Nov. 17, 2020, Akihiro Yamori, Fujitsu Limited.
Chinese Office Action dated Oct. 27, 2022 for Chinese Application No. 201810948828.8.

* cited by examiner

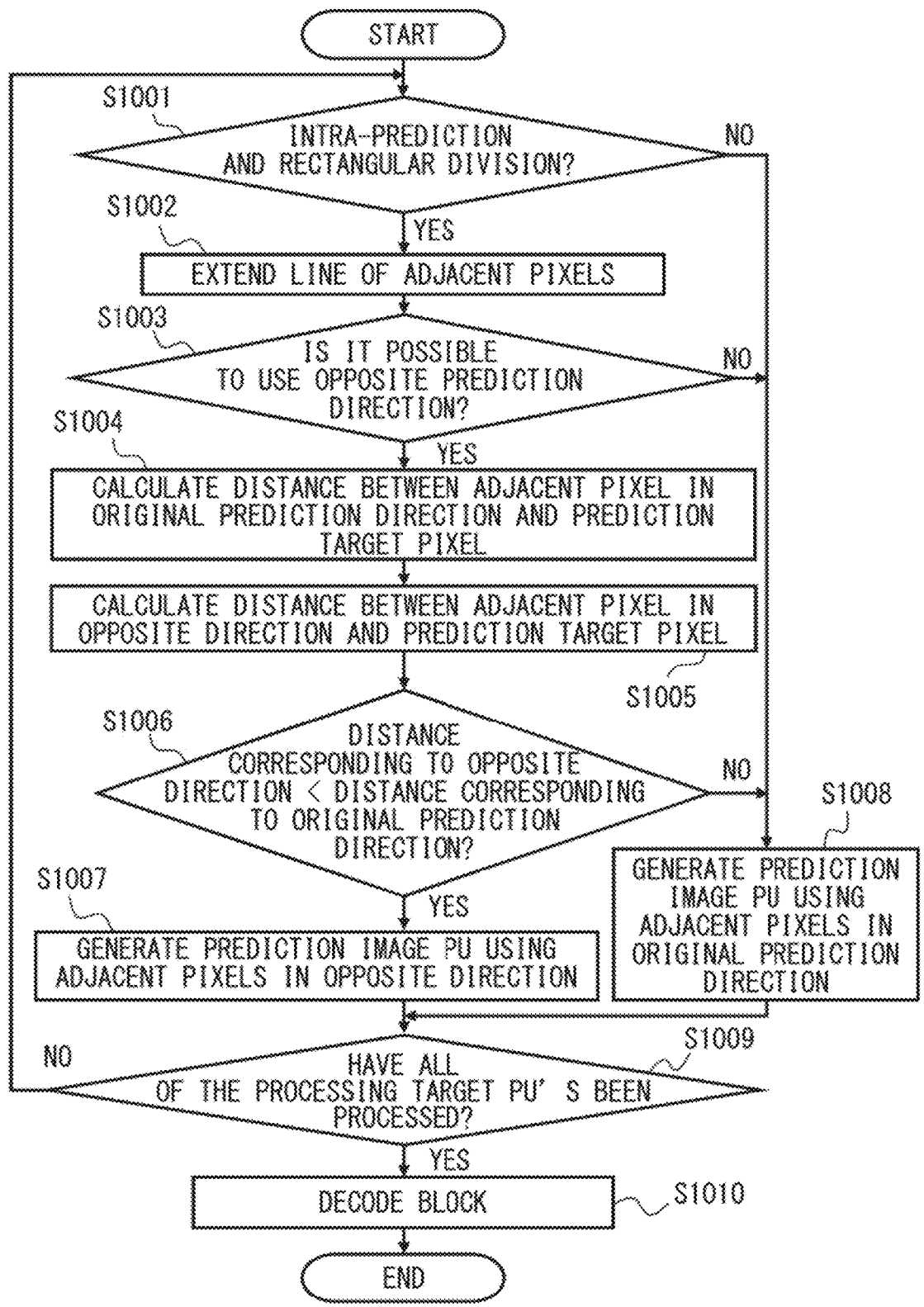
F I G. 1 0

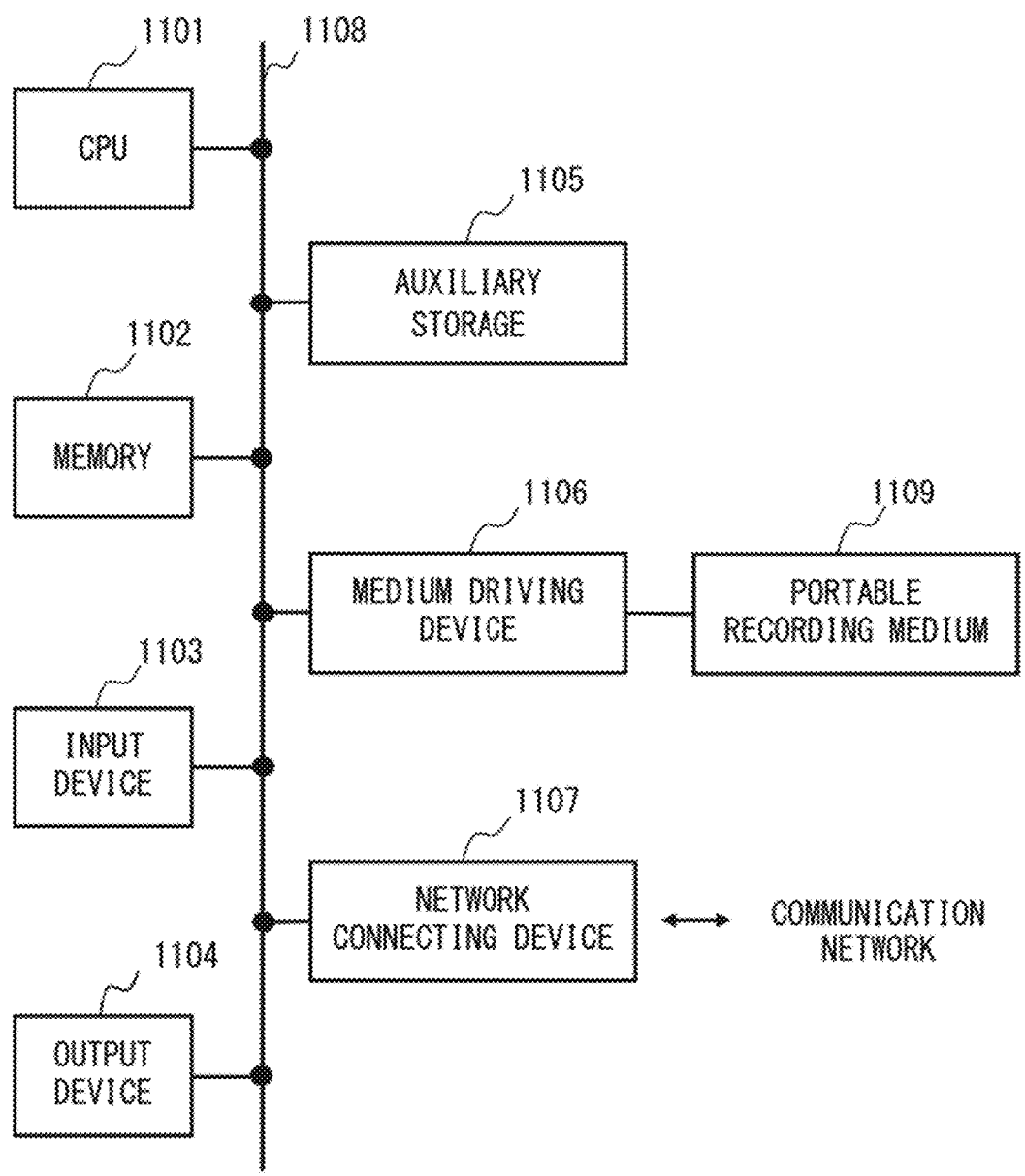
F I G. 11

IMAGE ENCODING DEVICE, IMAGE DECODING DEVICE, AND IMAGE PROCESSING METHOD

CROSS-REFERENCE TO RELATED APPLICATION

This application is a divisional of U.S. application Ser. No. 17/099,941, filed on Nov. 17, 2020 which is a divisional of U.S. application Ser. No. 16/847,381, filed on Apr. 13, 2020 which is a divisional of U.S. application Ser. No. 16/059,448, filed on Aug. 9, 2018 which is based upon and claims the benefit of priority of the prior Japanese Patent Application No. 2017-159965, filed on Aug. 23, 2017, the entire contents of which are incorporated herein by reference.

FIELD

The embodiments discussed herein are related to an image encoding device, an image decoding device, and an image processing method.

BACKGROUND

An intra-prediction is used for H.264/AVC (an international standard video compression scheme for a video) and for HEVC (ISO/IEC 23008: High Efficiency Video Coding). In the intra-prediction, a frame image is divided into blocks, and a prediction mode is selected that indicates how to perform an intra-prediction on a processing target block in the frame image from pixels in an encoded left adjacent block in the frame image and in an encoded upper adjacent block in the frame image (adjacent pixels). Then, an intra-prediction is performed using the selected prediction mode, so as to generate a prediction image of the processing target block. Next, in the processing target block, a prediction residual (prediction error) signal that corresponds to a difference between an original image and the prediction image. The prediction residual signal is transformed into a signal in the spatial frequency domain using the discrete cosine transform (DCT) or the discrete wavelet transform (DWT), and the signal in the spatial frequency domain is then quantized. Using an entropy coding, the quantized signal is binarized together with information on the prediction mode used for the intra-prediction, and is output as an encoded image signal. The similar coding scheme is applicable to a still image.

In HEVC, coding is performed for each block called a coding unit (CU). Each CU is divided into blocks each of which is called a prediction unit (PU) and on which a prediction is performed, and the PU is used for an intra-prediction. Video coding standards before the HEVC standard apply recursive processing in which it is determined whether a quad-tree partitioning is to be performed to divide a CU. Further, with respect to a PU that is a unit on which an intra-prediction is performed, video coding standards before the HEVC standard also apply processing in which it is determined whether the size of a CU is to be unchanged or the CU is to be divided using a quad-tree partitioning. Thus, all of the blocks obtained by division have a square shape. On the other hand, the Joint Video Exploration Team (JVET) jointly established by the ISO/IEC SC29/WG11 (MPEG) and the ITU-T SG16 WP3/Q6 (VCEG) conducts researches on a next-generation video coding. Block partitioning called the quad-tree plus binary tree (QTBT) block partitioning which makes it possible to perform not only a quad-tree block division but also a binary tree block division to divide a CU has been proposed in the JVET. When the QTBT block partitioning is used, a binary tree block division can be performed on a CU to generate a PU, and this results in being able to select not only a square block but also a rectangular block as a PU block.

As described above, when an intra-prediction is used, a prediction image for a processing target block is generated using adjacent pixels in an encoded left adjacent block and in an encoded upper adjacent block, so there is a demand for a technology that efficiently performs an intra-prediction on a rectangular block from adjacent pixels.

The following technology is known as a conventional technology that performs an intra-prediction efficiently (see, for example, Japanese Laid-open Patent Publication No. 2016-027756). First, a reference pixel signal is set from a decoded pixel signal in intra-prediction in which a prediction signal is generated in the same frame. Next, prediction mode identification information that identifies a prediction mode is acquired. Next, a prediction signal is generated based on the reference pixel signal and the prediction mode identification information. Next, in the prediction mode identified by the prediction mode identification information, a determination regarding correction of the prediction signal is performed using a reference pixel having a shorter distance from a prediction target pixel. Further, the generated prediction signal is corrected according to a result of the determination. The determination includes determining a correction range of the prediction target pixel from a parameter indicating a shape of a function, the function being defined using a decoded pixel adjacent to the upper left side of a prediction target block as an origin. In this configuration, an decoded reference pixel situated closer to a prediction target pixel is used to generate a prediction signal when an intra-prediction is used, which results in being able to reduce a prediction residual energy and to improve a subjective image quality and an encoding efficiency.

As described above, in an intra-prediction before the HEVC standard, all of the processing target block have a square shape, so there is no difference in distance between a prediction from a left adjacent pixel and a prediction from a an upper adjacent pixel. However, such a relationship will be changed if it is possible to use a processing target block having a rectangular shape due to the usage of the above-described QTBT block partitioning and an intra-prediction is performed on the rectangular block. For example, in the case of a horizontally long rectangular block, a left adjacent pixel is situated away from a respective prediction target pixel in the rectangular block. On the other hand, in the case of a vertically long rectangular block, an upper adjacent pixels is situated away from a respective prediction target pixel in the rectangular block.

Thus, conventionally, if an intra-prediction is performed on a rectangular block and a prediction image is generated using distant adjacent pixels, there will be a decrease in prediction efficiency and an energy of the prediction residual signal described above will be more likely to be increased. This results in a decrease in encoding efficiency.

In the conventional technology described above that corrects a prediction target pixel from a parameter indicating a shape of a function, there is a need to encode a number that identifies correction information or a parameter indicating a shape of a function and to transmit it to the decoding side, in order to improve an encoding performance. This may result in a decrease in transmission efficiency.

SUMMARY

According to an aspect of the invention, an image encoding device according to embodiments performs, in an image, an intra-prediction on a block obtained by dividing the image so as to encode the block. The image encoding device includes a memory and a processor coupled to the memory.

The processor selects a rectangular block as the block.

The processor adds a certain prediction direction as a selection target intra-prediction direction when the rectangular block is selected, wherein the certain prediction direction is one of prediction directions in which a pixel that is adjacent to a short side of the rectangular block is referred to, and an adjacent pixel in a left or upper block that is adjacent to a long side of the rectangular block is referred to in another prediction direction that is 180 degrees opposite to the certain prediction direction.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF THE DRAWINGS

FIG. 10 is a flowchart that illustrates an example of decoding processing that is focused on an intra-prediction and is performed by the video decoding device; and FIG. 11 is an example of a hardware configuration of a computer that can be implemented as a video encoding device or a video decoding device.

DESCRIPTION OF EMBODIMENTS

An intra-prediction and a prediction mode are described before embodiments of the present invention are described in detail.

Figure 1:
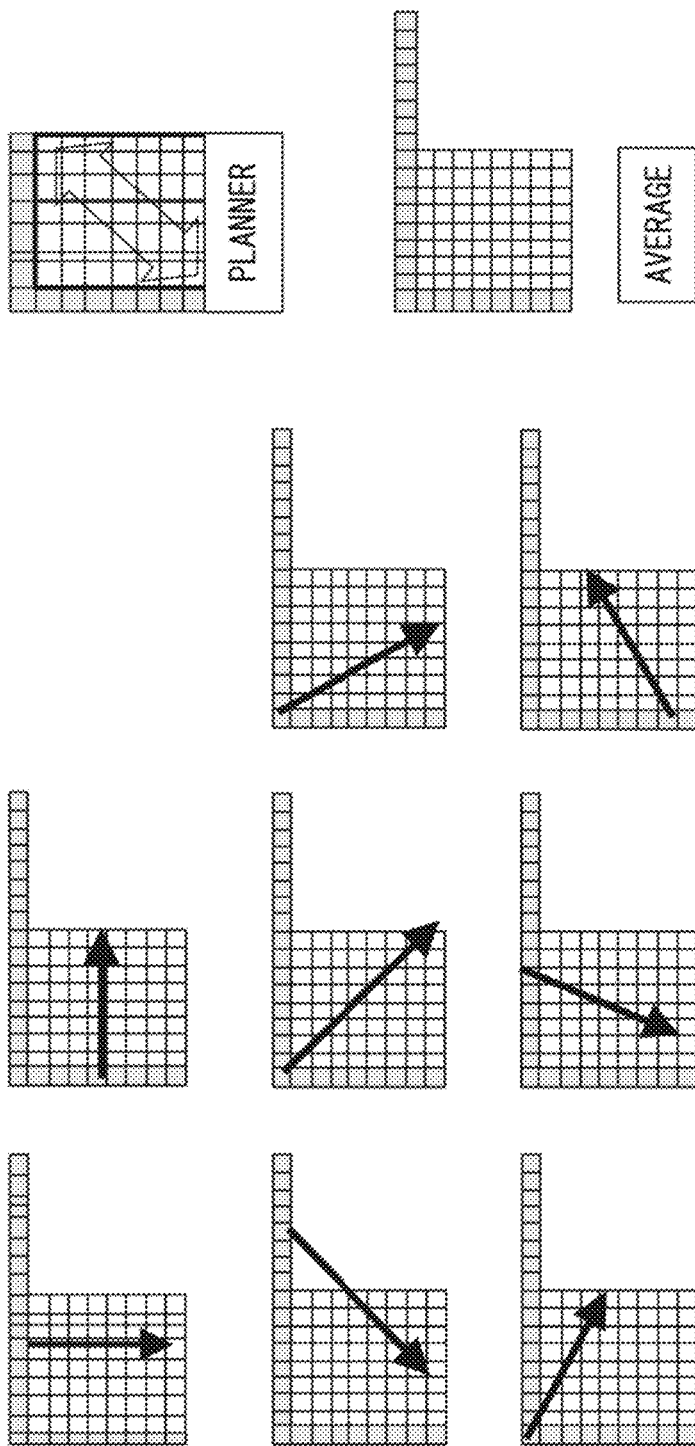
FIG. 1 illustrates an intra-prediction performed on a square block.

As described above, video coding standards before the HEVC standard apply recursive processing in which it is determined whether a quad-tree partitioning is to be performed to divide a CU. Further, with respect to a PU that is a unit on which an intra-prediction is performed, video coding standards before the HEVC standard also apply processing in which it is determined whether the size of a CU is to be unchanged or the CU is to be divided using a quad-tree partitioning. Thus, all of the blocks obtained by division have a square shape. FIG. 1 illustrates an intra-prediction performed on such a square block. For example, prediction is performed on a PU that is an 8×8 block of white pixels, using adjacent dark-color pixels that are located adjacent to the PU on the left side and on the upper side of the PU. As indicated by the direction of each arrow in FIG. 1, different schemes are used to determine weighting of a prediction image that is calculated using adjacent pixels. A maximum of 10 different prediction modes are used for H.264/AVC (international standard video compression scheme), and a maximum of 35 different prediction modes are used for High Efficiency Video Coding (HEVC).

Figure 2:
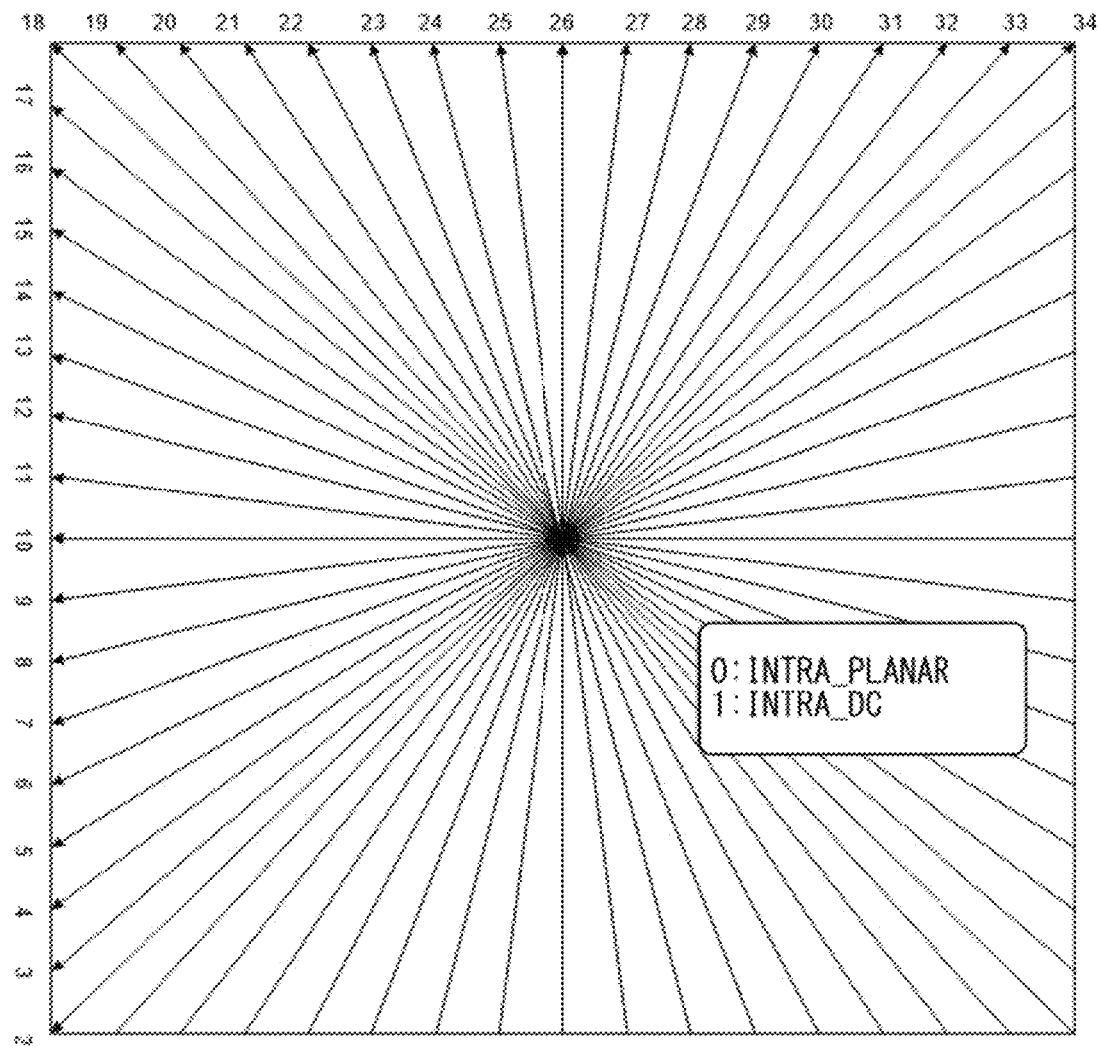
FIG. 2 illustrates prediction modes used for HEVC.

FIG. 2 illustrates prediction modes used for HEVC. For HEVC, a prediction mode can be selected from a total of 35 prediction modes each having a respective mode number illustrated in FIG. 2, including a planar prediction with mode No. 0, a DC prediction with mode No. 1, and angular predictions with mode No. 2 to mode No. 34. In the planar prediction with mode No. 0, each prediction pixel in a PU is generated from a planar approximation of encoded adjacent pixels situated on the left side and on the upper side of the PU. In the DC prediction with mode No. 1, each prediction pixel in a PU is generated as an average of encoded adjacent pixels situated on the left side and on the upper side of the PU. In the angular predictions with mode No. 2 to mode No. 34, a centrally located prediction pixel is generated from adjacent pixels each situated in a position indicated by a respective arrow from among the arrows with the numbers 2 to 34 from lower left corner to upper right, as illustrated in FIG. 2. As can be seen in FIG. 2, there are 33 prediction modes for the angular prediction.

Figure 3B:
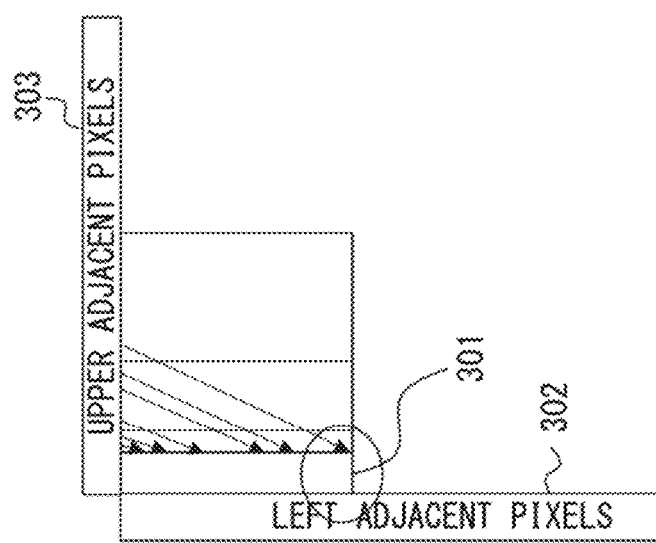
FIG. 3B is a diagram for explaining a relationship of a rectangular block with a distance between an adjacent pixel and a corresponding pixel in the rectangular block.
Figure 3A:
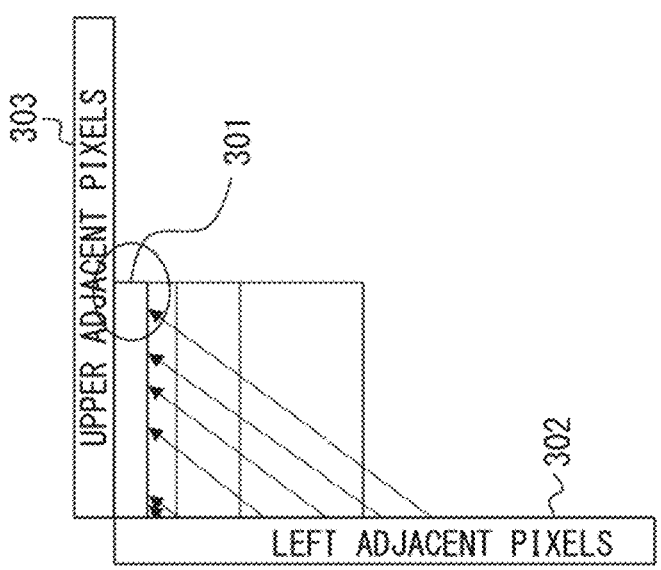
FIG. 3A is a diagram for explaining a relationship of a rectangular block with a distance between an adjacent pixel and a corresponding pixel in the rectangular block.

In a conventional intra-prediction that uses prediction modes illustrated in FIG. 1 or 2, all of the processing target block PU have a square shape, so there is no difference in distance between a prediction from a line of left adjacent pixels and a prediction from a line of upper adjacent pixels. On the other hand, as described above, the QTBT block partitioning that makes it possible to use a binary tree block division in addition to a quad-tree block division to divide a CU has been proposed in the JVET, where not only a square block but also a rectangular block can be selected as a PU block. This results in an improvement in encoding performance. However, the usage of a rectangular block in the QTBT block partitioning changes the above-described relationship in which there is no difference in distance between a prediction from a left adjacent pixel and a prediction from an upper adjacent pixel. FIGS. 3A and 3B are diagrams for explaining a relationship of a rectangular block with a distance between an adjacent pixel and a corresponding pixel in the rectangular block. As illustrated in FIG. 3A, when a rectangular block 301 that is a PU has a horizontally long shape, there is a great distance from each prediction target pixel in rectangular block 301 to a respective left adjacent pixel 302, as indicated by the arrows in FIG. 3A. On the other hand, as illustrated in FIG. 3B, when the rectangular block 301 has a vertically long shape, there is a great distance from each prediction target pixel in the rectangular block 301 to a respective upper adjacent pixel 303, as indicated by the arrows in FIG. 3B. If a prediction image is generated from distant adjacent pixels in an intra-prediction, as illustrated in FIGS. 3A and 3B, there will be a decrease in prediction efficiency and an energy of a prediction residual signal will be more likely to be increased. This results in a decrease in encoding efficiency.

As illustrated in FIG. 3A, if the rectangular block 301 is farther away from a line of left adjacent pixels 302, the rectangular block 301 is closer to a line of upper adjacent pixels 303. On the other hand, as illustrated in FIG. 3B, if the rectangular block 301 is farther away from the line of upper adjacent pixels 303, the rectangular block 301 is closer to the line of left adjacent pixels 302.

Thus, in the embodiments described below, when a PU is a rectangular block, the following processing is performed every time a prediction mode is evaluated. In addition to an intra-prediction from a prediction direction that corresponds to the prediction mode (hereinafter referred to as an "original prediction direction"), an intra-prediction from a direction that is 180 degrees opposite to the original prediction direction (hereinafter referred to as an "opposite prediction direction") is also evaluated. Then, a prediction direction that has been highly evaluated is selected so that an operation that improves a prediction efficiency in intra-prediction is performed.

If a PU includes an edge pixel whose edge is sufficiently strong to pass through the PU, both an intra-prediction from a lower left direction and an intra-prediction from an upper right direction that is 180 degrees opposite to the lower left direction are correct. When an intra-prediction is performed, the prediction efficiency is expected to be higher if an adjacent pixel and a prediction target pixel are situated closer to each other. On the other hand, it is preferable that an increase in the number of directions of an intra-prediction (the number of prediction modes) be prevented as much as possible in light of encoding efficiency.

Thus, in the embodiments described below, the following control is performed. When, in addition to an intra-prediction from an original prediction direction, an intra-prediction from a prediction direction opposite to the original prediction direction can also be performed with respect to a certain prediction mode, and when an adjacent pixel and a prediction target pixel are situated closer to each other in the opposite prediction direction than in the original prediction direction, the prediction direction is changed to the opposite prediction direction and the prediction mode is determined in the opposite prediction direction. Accordingly, an intra-prediction is performed more efficiently in the embodiments.

The following is the point of the embodiments. When an intra-prediction is performed on a rectangular block, a certain prediction direction (for example, a prediction direction from lower left to upper right) and a prediction direction opposite to the certain prediction direction (for example, a prediction direction from upper right to lower left) are evaluated at the same time.

Figure 4:
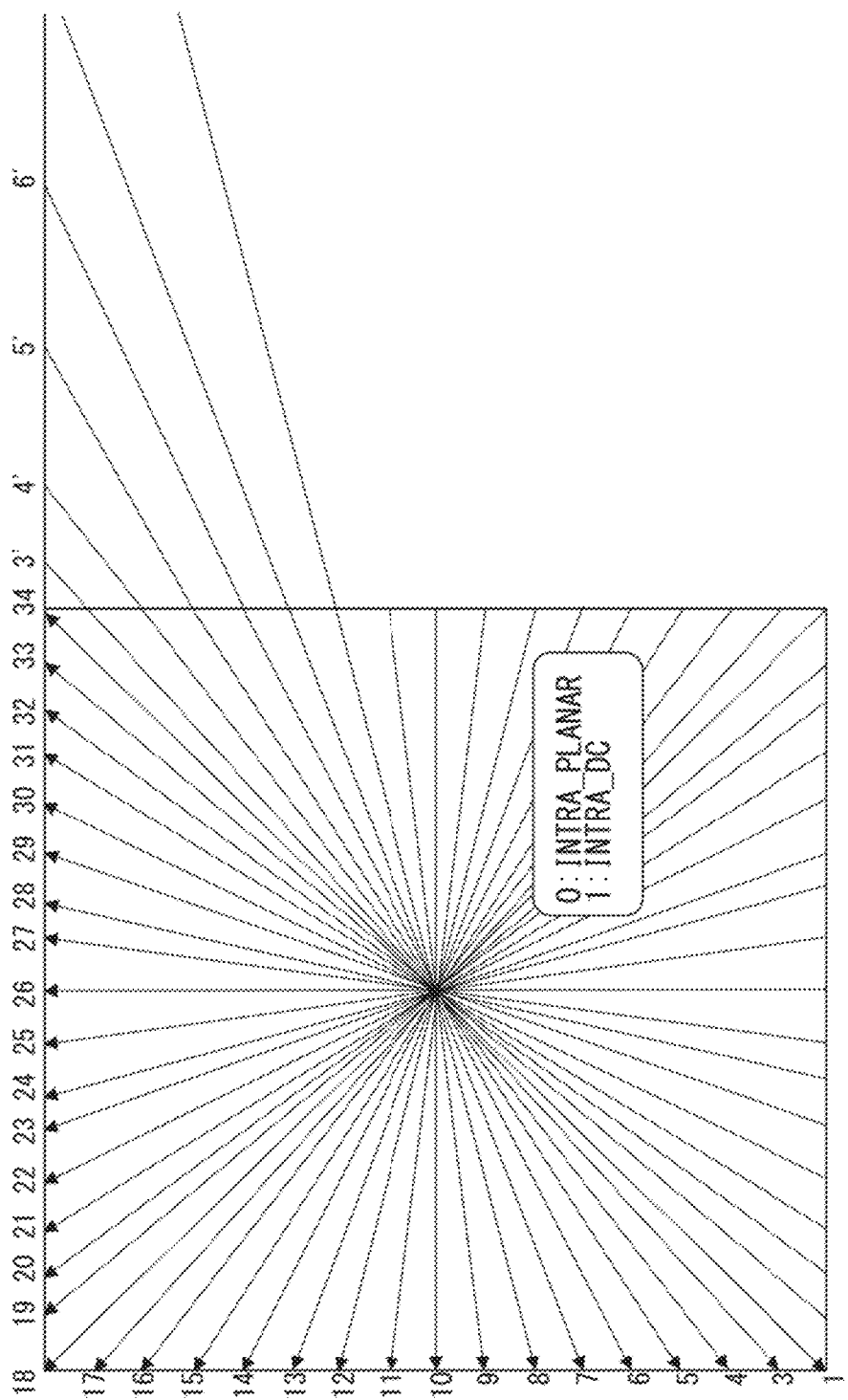
FIG. 4 is a diagram for explaining the case in which embodiments are applied to the prediction modes used for HEVC.

FIG. 4 is a diagram for explaining the case in which the embodiments are applied to the prediction modes used for HEVC illustrated in FIG. 2. With respect to a prediction mode that has a certain prediction direction from lower left to upper right (such as the angular prediction modes with mode No. 3 to mode No. 9 from among the angular prediction modes with mode No. 2 to mode No. 34), a prediction direction that is 180 degrees opposite to the certain prediction direction is defined. For example, when a prediction target pixel is used as a reference, the prediction direction from lower left to upper right is a direction of a counterclockwise angle that is greater than 180 degrees and less than 225 degrees, with the horizontally right direction being 0 degrees. The prediction directions that are 180 degrees opposite to the prediction directions from lower left to upper right are prediction directions with mode No. 3' to mode No. 9' (the numbers from 3' to 6' are indicated in the figure) that are obtained by extending a line of upper adjacent pixels with mode No. 18 to mode No. 34 in the horizontally right direction.

Further, with respect to a prediction mode that has a certain prediction direction from upper right to lower left (such as the prediction modes with mode No. 33 to mode No. 27), a prediction direction that is 180 degrees opposite to the certain prediction direction is also defined, although this is not illustrated. For example, when the prediction target pixel is used as a reference, the prediction direction from upper right to lower left is a direction of a counterclockwise angle that is greater than 45 degrees and less than 90 degrees, with the horizontally right direction being 0 degrees. The prediction directions that are 180 degrees opposite to the prediction directions from upper right to lower left are prediction directions with mode No. 33' to mode No. 27' (not illustrated) that are obtained by extending a line of upper adjacent pixels with mode No. 33 to mode No. 27 in the vertical direction.

In the embodiments, an appropriate intra-prediction is performed by implicitly determining (by determining without any increase in code amount) which of the two prediction directions defined as described above generates a better prediction image. When the determination described above is performed in accordance with the same algorithm in an image encoding device and an image decoding device, this makes it possible to perform an intra-prediction in an original prediction direction on the encoding side so as to encode a prediction mode that corresponds to the original prediction direction, and to perform, according to conditions, an intra-prediction in another prediction direction on the decoding side, the another prediction direction being a prediction direction opposite to the original prediction direction.

The following are basic operations of the embodiments described below.

Step 1: A distance between an adjacent pixel and a prediction target pixel in a processing target block is defined.

Step 2: If it is possible to perform an intra-prediction from a prediction direction that is opposite to an original prediction direction that corresponds to a certain prediction mode, the following processing will be performed. The distance of Step 1 that is calculated using an adjacent pixel in the original prediction direction is compared with the distance of Step 1 that is calculated using an adjacent pixel in the opposite prediction direction described above, and a direction with a smaller distance is selected.

Step 3: The direction selected in Step 2 is determined to be a prediction direction that corresponds to a current prediction mode.

An exact distance will be calculated in Step 1 described above if distances between all of the prediction target pixels in the processing target block and an adjacent pixel in the currently selected direction are summed. Alternatively, instead of the sum calculated as described above, it is also possible to use a sum of distances between prediction target pixels on the upper left corner and on the lower right corner in the processing target block and the adjacent pixel, or to only use a distance between a prediction target pixel on the lower right corner in the processing target block and the adjacent pixel, in order to reduce a calculation amount.

The embodiments based on the basic operations described above is described in detail with reference to the drawings.

Figure 5:
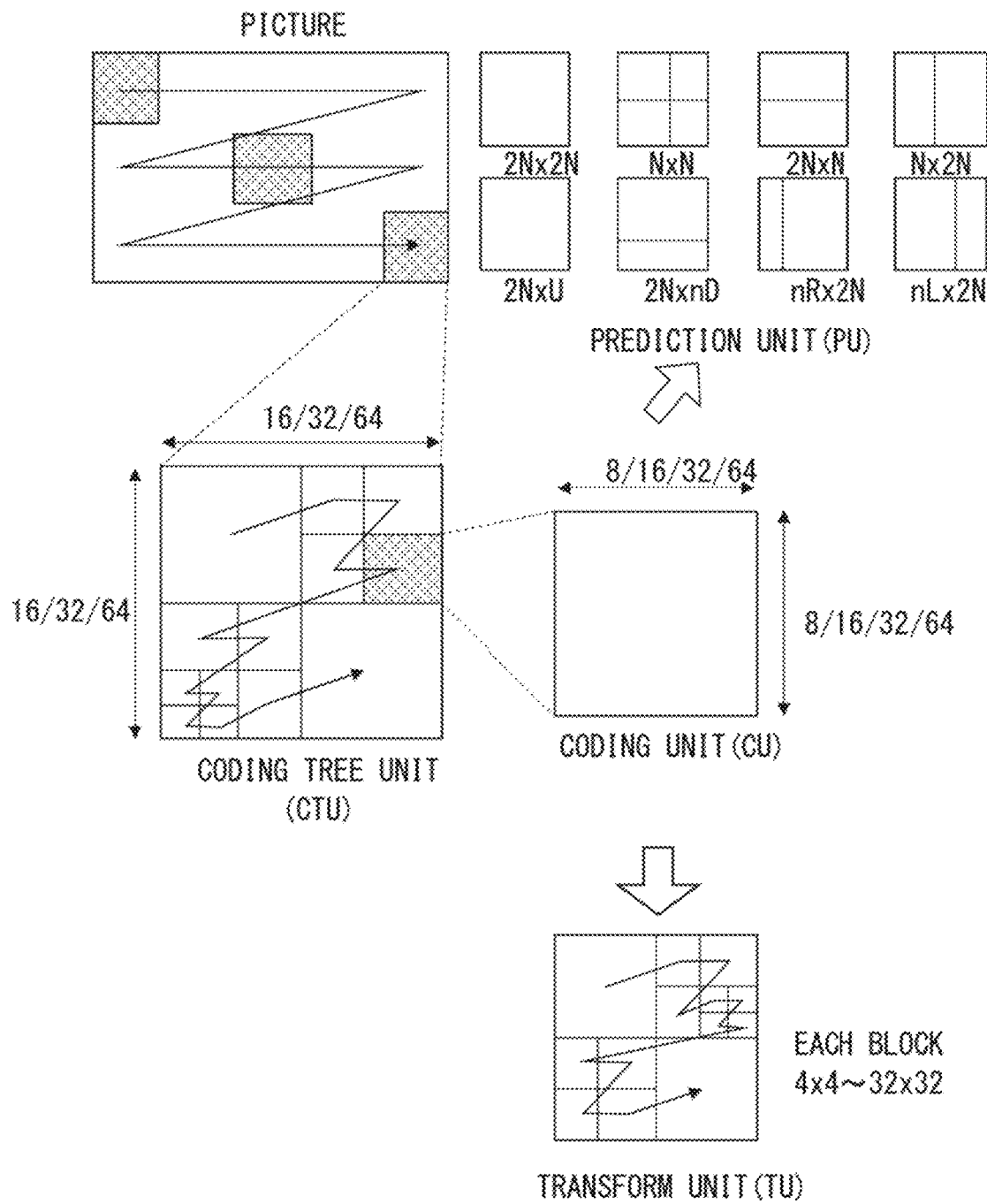
FIG. 5 illustrates blocks used for HEVC.

FIG. 5 illustrates blocks used for HEVC that are applied in the embodiments. In HEVC, a picture is divided into encoding target blocks (coding tree units: CTUs), and the CTUs are encoded in order of raster scanning. The CTU size remains unchanged for each sequence, and can be selected from pixel sizes between 64×64 pixels and 16×16 pixels. Further, the CTU is divided into first sub-block CUs with a quad-tree structure, and the CUs are encoded in order of raster scanning for each CTU. The CU has a variable size, and the CU size can be selected from pixel sizes of CU partitioning modes of 8×8 pixels and 64×64 pixels. The CU is a unit used to select the coding mode between an intra-prediction and an inter-prediction. The CU is processed for each second sub-block PU and is also processed for each third sub-block TU (transform unit). The PU is a unit on which prediction is performed in each coding mode. For example, the PU is a unit used to determine the intra-prediction mode when an intra-prediction is performed. The PU is a unit used to perform a motion compensation when an inter-prediction is performed. For example, when an inter-prediction is performed, the PU size can be selected from pixel sizes of PU partitioning modes (PartMode) of 2N×2N, N×N, 2N×N, N×2N, 2N×U, 2N×nD, nR×2N, and nL×2N. On the other hand, the TU is a unit used for an orthogonal transform performed by an orthogonal transform/quantization unit 610 of FIG. 6 described later, and the TU size can be selected from pixel sizes between 4×4 and 32×32. The TU is divided with a quad-tree structure, and division blocks are processed in order of raster scanning.

Figure 6:
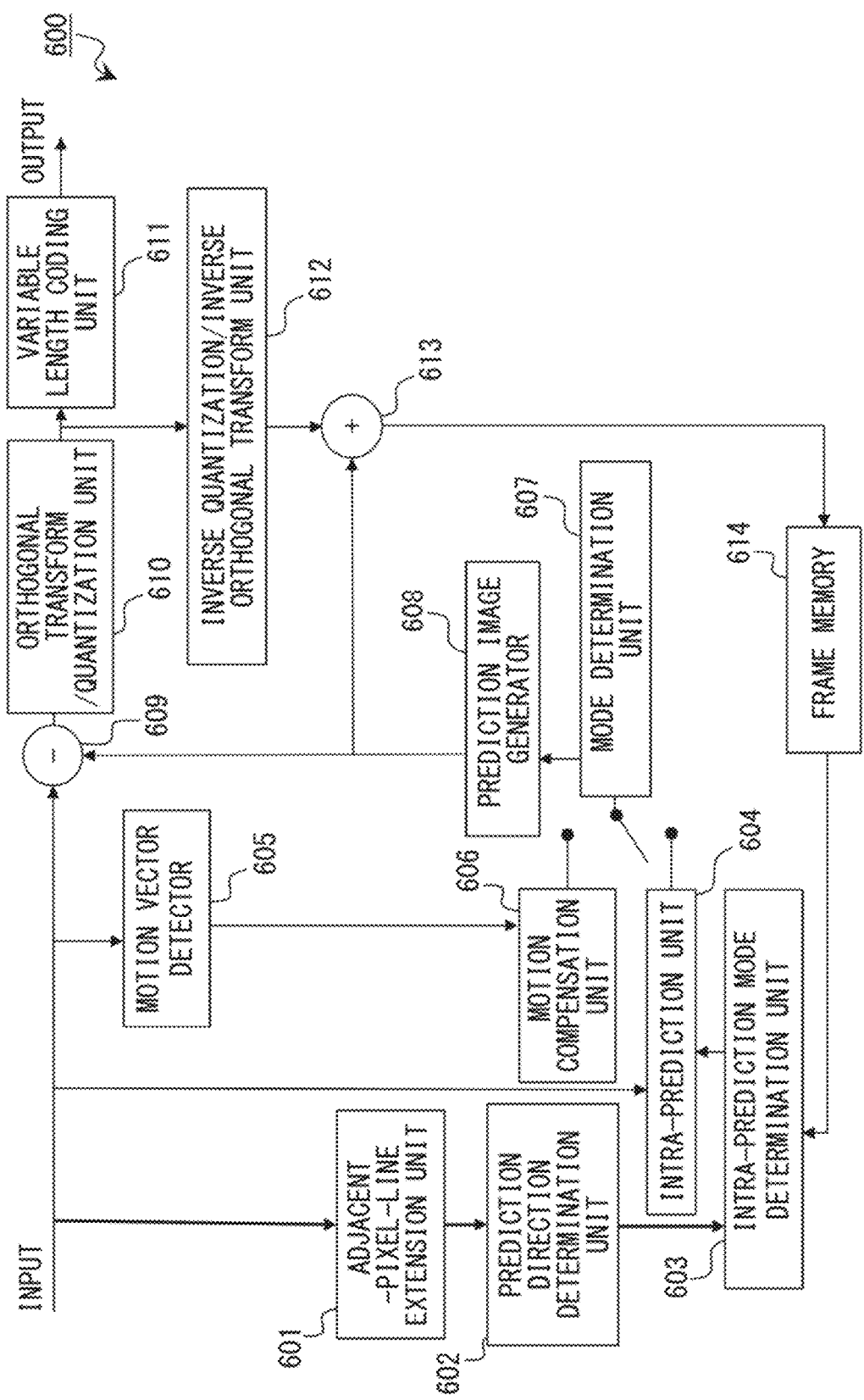
FIG. 6 is a block diagram that illustrates an example of a configuration of a video encoding device according to the embodiments.

FIG. 6 is a block diagram that illustrates an example of a configuration of a video encoding device according to the embodiments. A video encoding device 600 illustrated in FIG. 6 includes an adjacent-pixel-line extension unit 601, a prediction direction determination unit 602, an intra-prediction mode determination unit 603, an intra-prediction unit 604, a motion vector detector 605, a motion compensation unit 606, a mode determination unit 607, and a prediction image generator 608. The video encoding device further includes a residual calculator 609, the orthogonal transform/quantization unit 610, a variable length coding unit 611, an inverse quantization/inverse orthogonal transform unit 612, a reference image calculator 613, and a frame memory 614.

In FIG. 6, inter-prediction processing and intra-prediction processing are performed on an image for each CU described in FIG. 5 (hereinafter referred to as a "processing target CU") and for each PU obtained by dividing the CU (hereinafter referred to as a processing target PU), the image being input from an input unit (not illustrated).

The inter-prediction processing on a processing target CU and a processing target PU obtained by diving the processing target CU is performed by the motion vector detector 605 and the motion compensation unit 606. First, the motion vector detector 605 receives an input of an image of a current frame (hereinafter referred to as an "original image"), and also receives, from the frame memory 614, an input of a reference image that is an encoded locally-decoded image (described later) generated in the video encoding device 600. The motion vector detector 605 cuts processing target CUs of the same portion out of the original image and the reference image, respectively. The motion vector detector 605 further cuts a PU of the same portion out of the original image and the reference image, respectively, the PU corresponding to a processing target PU obtained by dividing the processing target CU (the PU cut out of the original image is referred to as an "original image PU" and the PU cut out of the reference image is referred to as a "reference image PU"). The motion vector detector 605 calculates an absolute difference between a pixel of the original image PU and a corresponding pixel of the reference image PU. The motion vector detector 605 calculates a sum-of-absolute differences SAD_cost (Sum Absolute Difference) with respect to the calculated absolute differences of the respective pixel pairs. For example, when the PU has a 16×16-pixel size, SAD_cost is an accumulation value of the calculated absolute differences described above with respect to a total of 256 pixels along a raster scan line from the upper left corner to the lower right corner, and is calculated using Formula (1) below.

$$\text{SAD\_cost} = \Sigma |\star org - \star ref| \quad (1)$$

Here, "*org" represents each pixel value of an original image PU, and "*ref" represents each pixel value of a reference image PU.

The motion vector detector 605 performs a motion search according to the calculated sum-of-absolute differences SAD_cost, and searches for an optimal motion vector using, for example, a minimum value of the calculated sum-of-absolute differences. In general, not only a magnitude of a sum-of-absolute differences between pixels, but also an evaluation value of a motion vector is taken into consideration when a motion search is performed. When a certain motion vector of a certain PU is encoded, a component of the certain motion vector itself is not encoded, but a difference vector corresponding to a difference between the certain motion vector and a motion vector of a neighboring PU of the certain PU is encoded. Thus, the motion vector detector 605 calculates a difference vector corresponding to a difference between an encoding target motion vector of a certain PU and a motion vector of a neighboring PU of the certain PU, and outputs an evaluation value that corresponds to a code length of the encoding target motion vector according to a magnitude of a component of the difference vector. Here, an evaluation value of a motion search is represented by "cost", and an evaluation value that corresponds to a code amount of a motion vector is represented by MV_cost (Motion Vector). The motion vector detector 605 searches for a motion vector position in which "cost" calculated using Formula (2) below by use of MV_cost described above and the sum-of-absolute differences SAD_cost calculated using Formula (1) has a minimum value. Here, λ is a Lagrange multiplier.

$$\text{cost} = \text{SAD\_cost} + \lambda \times \text{MV\_cost} \quad (2)$$

Actually, a PU may have a pixel size between 64×64 and 4×4, so a unit used to evaluate "cost" may be changed according to the pixel size of the PU.

Instead of SAD_cost described above, another evaluation value such as SATD (a differential cost obtained by performing the Hadamard transform) may also be used.

Next, the motion compensation unit 606 performs a motion compensation for a current processing target PU according to a motion vector detected by the motion vector detector 605. The motion compensation unit 606 applies the motion vector detected by the motion vector detector 605 to a reference image PU read by the motion vector detector 605 from the frame memory 614. Then, the motion compensation unit 606 generates a PU of a prediction image (hereinafter referred to as a "prediction image PU") that corresponds to an original image PU, and determines it as a prediction image PU obtained by performing an inter-prediction. The motion compensation unit 606 combines all of the prediction image PUs of the entire processing target CU, so as to generate a prediction image CU obtained by performing an inter-prediction on the processing target CU and to output the prediction image CU, each prediction image PU being obtained by performing an inter-prediction for each processing target PU.

On the other hand, intra-prediction processing on a processing target CU and a processing target PU obtained by diving the processing target CU is performed by the adjacent-pixel-line extension unit 601, the prediction direction determination unit 602, the intra-prediction mode determination unit 603, and the intra-prediction unit 604 of FIG. 6.

First, when a processing target PU obtained by dividing a processing target CU is a rectangular block, the adjacent-pixel-line extension unit 601 performs the following processing. When the rectangular block has a horizontally long shape, the adjacent-pixel-line extension unit 601 extends a line of upper adjacent pixels of the rectangular block up to a pixel included in an upper block that is adjacent to an extension obtained by extending a long side of the rectangular block in a horizontally right direction (refer to the description of FIG. 4). When the rectangular block has a vertically long shape, the adjacent-pixel-line extension unit 601 extends a line of left adjacent pixels of the rectangular block up to a pixel included in a left block that is adjacent to an extension obtained by extending a long side of the rectangular block in a vertically downward direction. As an adjacent pixel value, the adjacent-pixel-line extension unit 601 uses a value of a pixel in a corresponding position of the reference image read from the frame memory 614.

Next, when the processing target PU is a rectangular block, the prediction direction determination unit 602 performs the operations of Steps 1, 2, and 3 described in FIG. 4 using the adjacent pixel value set by the adjacent-pixel-line extension unit 601, so as to select, for each prediction mode, one of an original prediction direction that corresponds to the prediction mode and an opposite prediction direction.

Taking into consideration the determination performed by the prediction direction determination unit 602, the intra-prediction mode determination unit 603 determines an intra-prediction mode for the processing target PU. While changing the intra-prediction mode sequentially (the 35 prediction modes illustrated in FIG. 2 in the case of HEVC), the intra-prediction mode determination unit 603 refers to an adjacent pixel in an intra-prediction direction based on the determination performed by the prediction direction determination unit 602 with respect to a current intra-prediction mode. Next, the intra-prediction mode determination unit 603 determines a tentative prediction value of each pixel of the processing target PU from a corresponding adjacent pixel to which the intra-prediction mode determination unit 603 referred (the PU constituted of tentative prediction values of respective pixels is hereinafter referred to as a "tentative prediction image PU"). The intra-prediction mode determination unit 603 calculates a sum-of-absolute differences SAD_cost between pixels of an original image PU and respective pixels of a tentative prediction image PU with respect to the current intra-prediction mode, as calculated using Formula (1) described above. Further, the intra-prediction mode determination unit 603 calculates a "cost" value that corresponds to the current intra-prediction mode using the calculated sum-of-absolute differences SAD_cost, as calculated using Formula (2). The intra-prediction mode determination unit 603 performs these calculations on all of the intra-prediction modes, and determines an intra-prediction mode with which the "cost" value becomes minimal to be an intra-prediction mode for the processing target PU.

The intra-prediction unit 604 of FIG. 6 determines, to be a prediction image PU obtained by performing an intra-prediction, the tentative prediction image PU calculated by the intra-prediction mode determination unit 603 for the intra-prediction mode determined by the intra-prediction mode determination unit 603. The intra-prediction unit 604 combines all of the prediction image PUs of the entire processing target CU, so as to generate a prediction image CU obtained by performing an intra-prediction on the processing target CU and to output the prediction image CU, each prediction image PU being obtained by performing an intra-prediction for each processing target PU.

The mode determination unit 607 of FIG. 6 compares the prediction image CU generated by the motion compensation unit 606 using an inter-prediction with the prediction image CU generated by the intra-prediction unit 604 using an intra-prediction. The mode determination unit 607 determines, from the comparison, which of an inter-prediction and an intra-prediction is more appropriate for encoding the current processing target CU. When the mode determination unit 607 has determined that it is more appropriate to perform an inter-prediction, the mode determination unit 607 outputs the prediction image CU generated by the motion compensation unit 606 to the prediction image generator 608. When the mode determination unit 607 has determined that it is more appropriate to perform an intra-prediction, the mode determination unit 607 outputs the prediction image CU generated by the intra-prediction unit 604 to the prediction image generator 608. The prediction image generator 608 outputs the prediction image CU input from the mode determination unit 607 to the residual calculator 609.

The residual calculator 609 of FIG. 6 calculates a difference between each pixel in an original image that corresponds to the current processing target CU (hereinafter referred to as an "original image CU") and a corresponding pixel in the prediction image CU output by the prediction image generator 608, so as to generate a CU of a prediction residual image (hereinafter referred to as a "prediction residual image CU").

The orthogonal transform/quantization unit 610 of FIG. 6 performs the orthogonal DCT transform, or the orthogonal Hadamard transform depending on the coding mode, on the prediction residual image CU for each TU size (refer to the description of FIG. 5), so as to transform the prediction residual image CU into a spatial-frequency-component signal. When an image is transformed into a spatial-frequency-component, a signal is gathered in a low frequency component due to a spatial correlativity of an image, so as to compress information. The orthogonal transform/quantization unit 610 performs sampling on a value obtained by performing the orthogonal transform, so as to increase the number of components whose coefficient value is zero.

The variable length coding unit 611 of FIG. 6 performs a variable length coding on only a coefficient that has become nonzero due to quantization performed by the orthogonal transform/quantization unit 610, and outputs the variable-length-coded coefficient. The variable length coding unit 611 performs coding called the CABAC which calculates an optimal code allocation corresponding to the probability of occurrence. This makes it possible to shorten a code length overall for any encoded bit string.

The inverse quantization/inverse orthogonal transform unit 612 of FIG. 6 performs an inverse quantization on the coefficient quantized by the orthogonal transform/quantization unit 610, and further performs an inverse orthogonal transform on a frequency component on which an inverse quantization has been performed, so as to transform the frequency component into a locally decoded prediction residual image.

The reference image calculator 613 of FIG. 6 adds, for each CU, a pixel value of the prediction image CU generated by the prediction image generator 608 to a corresponding pixel value of the locally decoded prediction residual image output by the inverse quantization/inverse orthogonal transform unit 612. Accordingly, the reference image calculator 613 generates a locally decoded reference image CU, and accumulates the locally decoded reference image CUs in the frame memory 614.

As described above, a processing target image that is identical to the processing target image generated on the decoding side is also generated on the encoding side. The image generated on the encoding side is referred to as a locally decoded image, and it is possible to perform a differential encoding on subsequent frame images by generating, on the encoding side, a processing target image that is identical to the processing target image on the decoding side.

Figure 7:
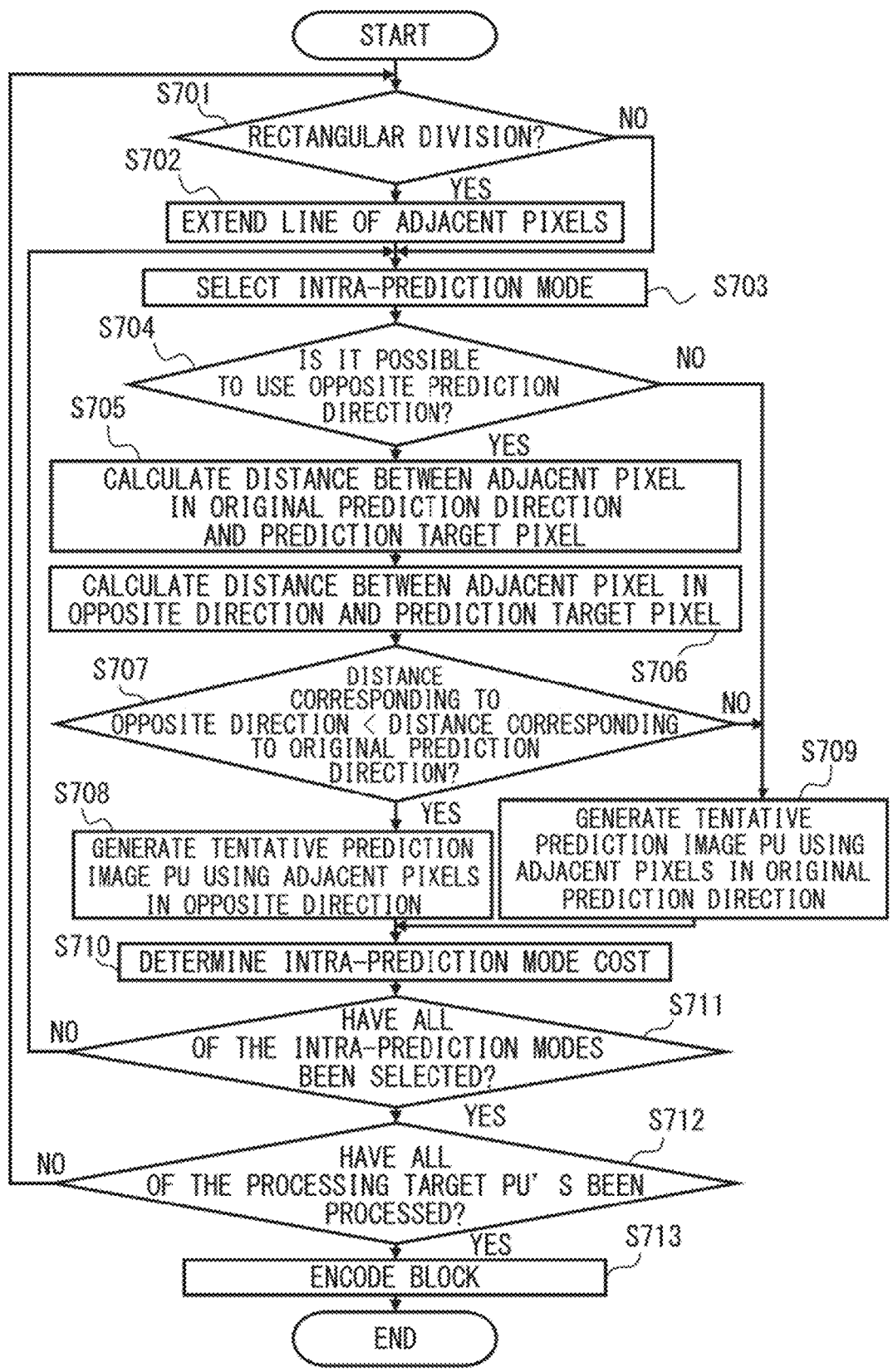
FIG. 7 is a flowchart that illustrates an example of encoding processing that is focused on an intra-prediction and performed by the video encoding device.

FIG. 7 is a flowchart that illustrates an example of encoding processing that is focused on an intra-prediction and performed by the video encoding device 600 of FIG. 6. The flowchart is described below referring to each component of FIG. 6 as needed.

First, the adjacent-pixel-line extension unit 601 divides a currently set processing target CU into processing target PUs, determines one of the processing target PUs, and determines whether the processing target PU is a rectangular division PU or not (a square division PU) (Step S701). When a conventional coding scheme before HEVC is applied, or when all of the units on which an intra-prediction is to be performed have a square shape even if the QTBT block partitioning is used, it is determined to be NO.

When the determination of a rectangular division in Step S701 is YES, the adjacent-pixel-line extension unit 601 performs the above-described processing of extending a line of adjacent pixels (Step S702). When the determination of a rectangular division in Step S701 is NO, the adjacent-pixel-line extension unit 601 skips the process of Step S702.

Next, one intra-prediction mode is selected by a controller (not illustrated) for the processing target PU (Step S703). In the case of HEVC, the intra-prediction mode is one of the 35 intra-prediction modes illustrated in FIG. 2.

Next, with respect to the intra-prediction mode selected in Step S703, the prediction direction determination unit 602 determines whether it is possible to use a prediction direction (abbreviated to "opposite direction" in FIG. 7) that is opposite to an original prediction direction that corresponds to the selected intra-prediction mode. It will be determined to be YES if all of the following conditions are satisfied: a rectangular block is selected as a processing target PU (it is determined to be YES in Step S701); the intra-prediction mode currently selected in Step S703 is one of the intra-prediction modes with mode No. 2 to mode No. 9 and mode No. 33 to mode No. 27 described in FIG. 4; and an adjacent pixel can be set in a pixel position in an opposite prediction direction due to extension processing being performed by the adjacent-pixel-line extension unit 601 (that is, the pixel position is within an original image), the opposite prediction direction being a prediction direction opposite to an original prediction direction that corresponds to the intra-prediction mode currently selected in Step S703.

When it has been determined to be YES in Step S704, the prediction direction determination unit 602 performs the operation of Step 1 described in FIG. 4. Accordingly, the prediction direction determination unit 602 calculates a distance between a prediction target pixel in the processing target PU and an adjacent pixel in the original prediction direction, and a distance between the prediction target pixel in the processing target PU and an adjacent pixel in the opposite prediction direction (Steps S705, S706). A sum of distances between all of the prediction target pixels in the processing target PU and adjacent pixels in the original prediction direction and respective adjacent pixels in the original prediction direction, and a sum of distances between all of the prediction target pixels in the processing target PU and respective adjacent pixels in the opposite prediction direction are calculated as the above-described distances.

Figure 8:
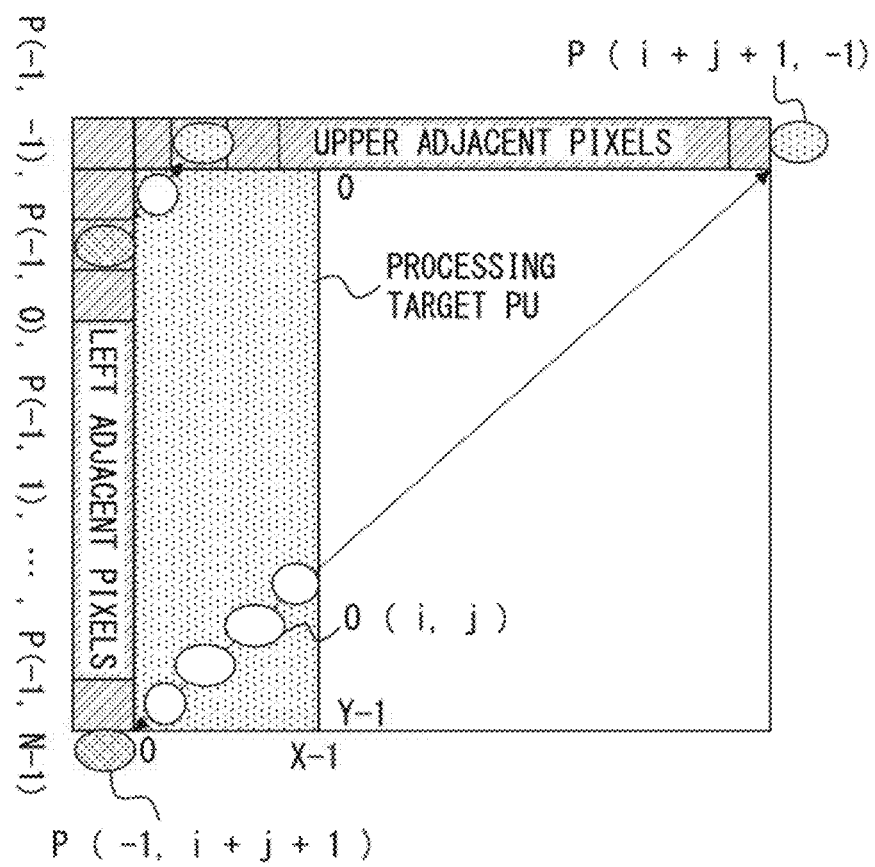
FIG. 8 is a diagram for explaining an operation of calculating a distance performed by a prediction direction determination unit.

FIG. 8 is a diagram for explaining an operation of calculating a distance performed by the prediction direction determination unit 602. Here, a simple specific example is described. With respect to intra-prediction modes other than the intra-prediction mode in the example described below, a sum of distances between all of the prediction target pixels in a processing target PU and respective adjacent pixels can also be calculated in accordance with standards.

It is assumed that a processing target PU has a rectangular shape having a size of [X,Y] (X<Y). A line of left adjacent pixels and a line of upper adjacent pixels that have been extended by the adjacent-pixel-line extension unit 601 (Step S702) are respectively defined by Formula (3) and Formula (4).

Line of left adjacent pixels:

$$P[-1, -1], P[-1, 0], P[-1, 1], \ldots, P[-1, XX] \quad (3)$$

Line of upper adjacent pixels:

$$P[-1, -1], P[0, -1], P[1, -1], \ldots, P[YY, -1] \quad (4)$$

Here, XX and YY are determined according to the magnitude relationship between X and Y. When an adjacent pixel is read as in the past, XX=2X+1 and YY=2Y+1. However, in the embodiments, the extension processing described in FIG. 4 is performed for a prediction direction, in which as many additional upper adjacent pixels as is needed to perform the intra-predictions with mode No. 3' to mode No. 9', or as many additional left adjacent pixels as is needed to perform the intra-predictions with mode No. 33' to mode No. 27' are read. In order to perform a calculation for the prediction mode with mode No. 9' or mode No. 27', there is a need for a largest increase in the number of adjacent pixels to be read (a widest extension of a line of adjacent pixels). In this case, an exact number of additional pixels may be calculated using an angle of the prediction mode, or an upper limit for reading an adjacent pixel may be defined such that an adjacent pixel is generated under the condition that a maximum value of XX for a pixel line extension is 4X+1 and P[−1,4X+1] is repeated after exceeding 4X+1.

Further, a prediction target pixel in a processing target PU is defined by Formula (5) below.

Prediction target pixel:

$$O[0, 0], O[0, 1], \ldots, O[X-1, Y-1] \quad (5)$$

For example, it is assumed that the original prediction direction of the intra-prediction mode selected in Step S703 is a direction from lower left with an angle of 225 degrees. It is also assumed that the opposite prediction direction that is opposite to the original prediction direction is a direction from upper right with an angle of 45 degrees.

In this example, a sum $D_{left}$ of distances between all of the prediction target pixels in the processing target PU and respective left adjacent pixels in the original prediction direction is calculated in Step S705 using Formula (6) below. Here, "|P(−1, i+j+1), O(i,j)|" indicates a calculation to obtain a pixel-position distance between an adjacent pixel P(−1, i+j+1) and a prediction target pixel O(i,j).

$$D_{left} = \sum_{j}^{Y} \sum_{i}^{X} |P(-1, i+j+1), O(i, j)| \qquad (6)$$

In the above example, a sum $D_{upper}$ of distances between all of the prediction target pixels in the processing target PU and respective upper adjacent pixels in the opposite prediction direction is calculated in Step S706 using Formula (7) below. Here, "|P(i+j+1,−1),O(i,j)|" indicates a calculation to obtain a pixel position distance between an adjacent pixel P(i+j+1,−1) and a prediction target pixel O(i,j).

$$D_{upper} = \sum_{j}^{Y} \sum_{i}^{X} |P(i+j+1, -1), O(i, j)| \qquad (7)$$

Next, the prediction direction determination unit 602 determines whether the sum of distances corresponding to the opposite prediction direction that is calculated in Step S706 is smaller than the sum of distances corresponding to the original prediction direction that is calculated in Step S705 (Step S707). Here, it is determined whether adjacent pixels in the opposite prediction direction are situated on average closer to the processing target PU than adjacent pixels in the original prediction direction.

When it has been determined to be YES in Step S707, the intra-prediction mode determination unit 603 of FIG. 6 refers to an adjacent pixel in the opposite prediction direction that is opposite to the original prediction direction of the intra-prediction mode selected in Step S703. Then, according to the adjacent pixel to which the intra-prediction mode determination unit 603 referred, the intra-prediction mode determination unit 603 determines a tentative prediction value of each prediction target pixel in the processing target PU, so as to generate the tentative prediction target image PU described above (Step S708).

When it has been determined to be NO in Step S707, or when it has been determined to be NO in Step S704 described above because it is not possible to use an opposite prediction direction that is opposite to an original prediction direction corresponding to a current intra-prediction mode, the intra-prediction mode determination unit 603 performs the following processing. The intra-prediction mode determination unit 603 refers to an adjacent pixel in the original prediction direction of the intra-prediction mode selected in Step S703. Then, according to the adjacent pixel to which the intra-prediction mode determination unit 603 referred, the intra-prediction mode determination unit 603 determines a tentative prediction value of each prediction target pixel in the processing target PU, so as to generate the tentative prediction target image PU described above (Step S709).

Next, the intra-prediction mode determination unit 603 calculates a sum-of-absolute differences SAD_cost between a pixel in an original image PU and a corresponding pixel in the tentative prediction image PU generated in Step S708 or S709, using Formula (1) described above. Further, the intra-prediction mode determination unit 603 calculates a cost value ("cost" value) that corresponds to a current intra-prediction mode selected in Step S703, using Formula (2) described above by use of the calculated sum-of-absolute differences SAD_cost. Then, the intra-prediction mode determination unit 603 determines whether the cost value calculated this time is smaller than each of the cost values for the intra-prediction modes preciously selected in Step S703. When it has been determined to be YES, the intra-prediction mode determination unit 603 determines the current intra-prediction mode selected in Step S703 to be a tentative output value of an intra-prediction mode that corresponds to the current processing target PU. Further, the intra-prediction unit 604 of FIG. 6 determines the tentative prediction image PU generated in Step S708 or S709 for the current intra-prediction mode to be a tentative output value of a prediction image PU obtained by performing the intra-prediction that corresponds to the current processing target PU (Step S710).

Next, the controller (not illustrated) determines whether a series of processes including Steps S703 to S710 described above has been performed on all of the selectable intra-prediction modes (such as the 35 intra-prediction modes illustrated in FIG. 2 in the case of HEVC) (Step S711).

When it has been determined to be NO in Step S711, the process returns to Step S703, and the series of processes including Steps S703 to S710 is performed on a next intra-prediction mode.

When it has been determined to be YES in Step S711, a tentative output value of an intra-prediction mode that is output by the intra-prediction mode determination unit 603 at this point is determined to be an output value of an intra-prediction mode finally determined for the current processing target PU. Further, a tentative output value of a prediction image PU that is output by the intra-prediction unit 604 at this point is determined to be an output value of a prediction image PU obtained by performing an intra-prediction finally determined for the current processing target PU.

Next, the controller (not illustrated) determines whether a series of processes including Steps S701 to S711 described above has been performed on all of the processing target PUs obtained by dividing the processing target CU (refer to FIG. 5) (Step S712).

When it has been determined to be NO in Step S712, the process returns to Step S701, and the series of processes including Steps S701 to S711 is performed on a next processing target PU in the processing target CU.

When it has been determined to be YES in Step S712, the determination of an intra-prediction mode and the generation of a prediction image PU obtained by performing an intra-prediction that uses the intra-prediction mode have been completed with respect to all of the processing target PUs in the processing target CU, and a prediction image CU that corresponds to the current processing target CU is determined.

Then, block encoding processing is performed on the processing target CU (Step S713). In Step S713, the following series of processing is performed.

First, the mode determination unit 607 of FIG. 6 receives, from the motion compensation unit 606, an input of a prediction image CU obtained by combining prediction image PUs obtained by performing an inter-prediction into one CU, the prediction image PUs having been generated by the above-described inter-prediction processing being performed by the motion vector detector 605 and the motion compensation unit 606. Further, the mode determination unit 607 receives an input of a prediction image CU that is output from the intra-prediction unit 604 as a result of repeating the processes until Step S712 as described above, the prediction image CU being obtained by combining prediction image PUs obtained by performing an intra-prediction into one CU. The mode determination unit 607 compares the prediction image CU obtained by performing the inter-prediction with the prediction image CU obtained by performing the intra-prediction. The mode determination unit 607 determines, from the comparison, which of the inter-prediction and the intra-prediction is more appropriate to encode the current processing target CU. Then, the mode determination unit 607 transmits the prediction image CU obtained by performing the prediction that has been determined to be more appropriate to the residual calculator 609 via the prediction image generator 608.

The residual calculator 609 of FIG. 6 calculates a difference between each pixel in an original image CU that corresponds to the current processing target CU and a corresponding pixel in the prediction image CU received from the prediction image generator 608, so as to generate a prediction residual image CU.

The above-described encoding processing is performed by the orthogonal transform/quantization unit 610 and the variable length coding unit 611 of FIG. 6 on each TU (refer to FIG. 5) of the prediction residual image CU, so as to output encoded image information that corresponds to the processing target CU.

Further, as described above, the inverse quantization/inverse orthogonal transform unit 612 of FIG. 6 generates a locally decoded image, and the reference image calculator 613 of FIG. 6 accumulates the locally decoded images in the frame memory 614.

When the series of processes in Step S713 described above has been completed, the encoding processing in the flowchart of FIG. 7 that is performed by the video encoding device 600 of FIG. 6 is terminated.

Next, another embodiment of the distance calculation processing performed in Steps S705 and S706 of FIG. 7 is described. The example in which a sum of distances between all of the prediction target pixels in a processing target PU and respective adjacent pixels in an original prediction direction, and a sum of distances between all of the prediction target pixels in the processing target PU and respective adjacent pixels in an opposite prediction direction and are calculated as the distances calculated in Steps S705 and S706 has been described. On the other hand, a sum of distances between prediction target pixels on the upper left corner and on the lower right corner in a processing target PU and respective adjacent pixels in the original prediction direction, and a sum of distances between the prediction target pixels on the upper left corner and on the lower right corner in the processing target PU and respective adjacent pixels in the opposite prediction direction may be calculated as the distances calculated in Steps S705 and S706. In this case, Formula (6) and Formula (7) described above are respectively replaced with Formula (8) and Formula (9) below in the example indicated by the description of Step S703.

$$D_{left} = |P(-1, +1), O(0, 0)| + |P(-1, X+Y-1), O(X-1, Y-1)| \quad (8)$$

$$D_{upper} = |P(1, -1), O(0, 0)| + |P(X+Y-1, -1), O(X-1, Y-1)| \quad (9)$$

As represented by Formula (8) and Formula (9) described above, a distance-calculation amount can be reduced by using only prediction target pixels on the upper left corner and on the lower right corner in a processing target PU to calculate a distance.

In order to further reduce the calculation amount, a distance between a prediction target pixel on the lower right corner in a processing target PU and a respective adjacent pixel in the original prediction direction, and a distance between the prediction target pixel on the lower right corner in the processing target PU and a respective adjacent pixel in the opposite prediction direction may be calculated as the distances calculated in Steps S705 and S706.

Figure 9:
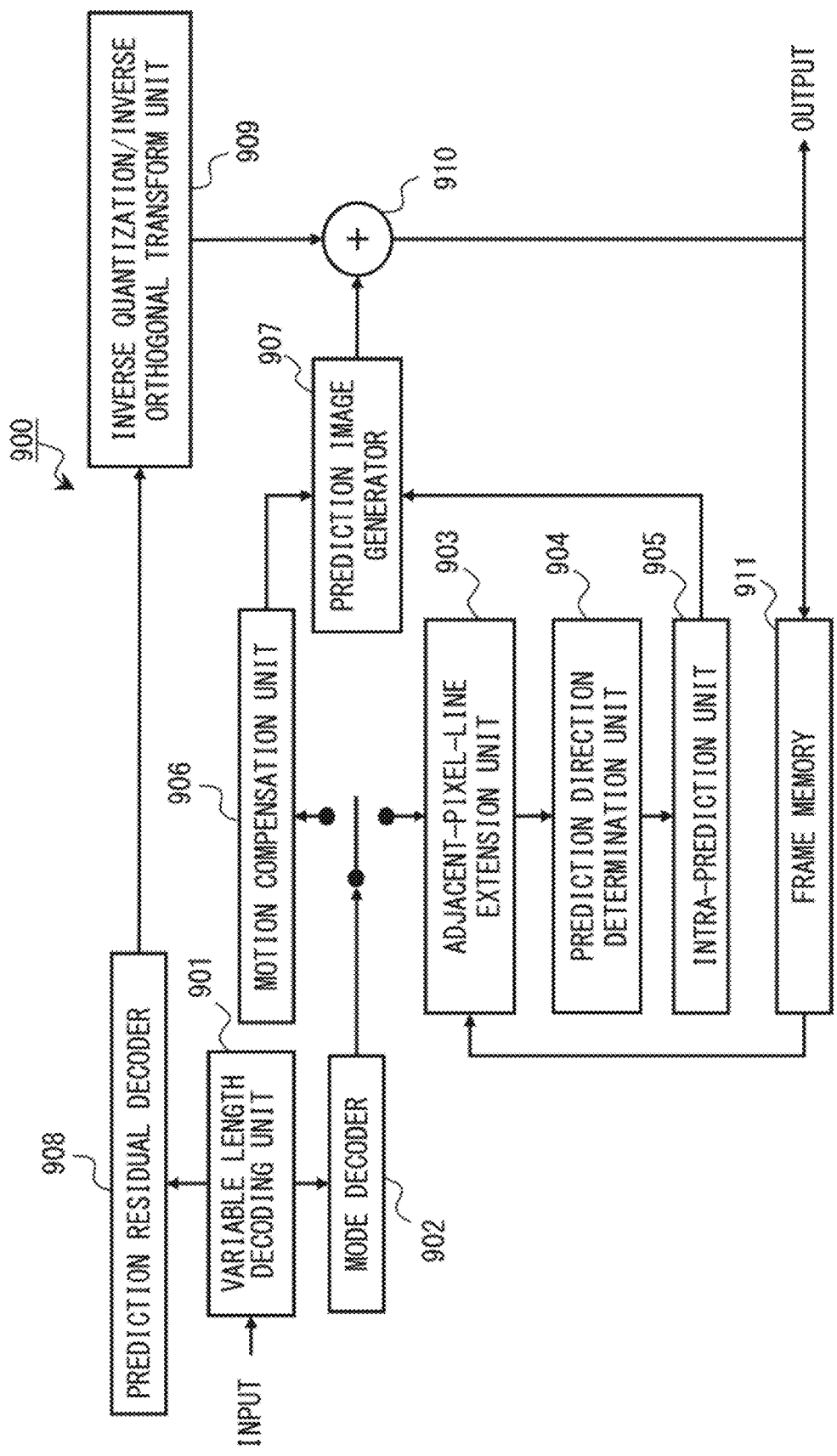
FIG. 9 is a block diagram that illustrates an example of a configuration of a video decoding device according to the embodiments.

FIG. 9 is a block diagram that illustrates an example of a configuration of a video decoding device according to the embodiments. A video decoding device 900 illustrated in FIG. 9 includes a variable length decoding unit 901, a mode decoder 902, an adjacent-pixel-line extension unit 903, a prediction direction determination unit 904, an intra-prediction unit 905, a motion compensation unit 906, and a prediction image generator 907. The video decoding device 900 further includes a prediction residual decoder 908, an inverse quantization/inverse orthogonal transform unit 909, a decoded image calculator 910, and a frame memory 911.

In FIG. 9, first, the variable length decoding unit 901 performs variable length decoding processing on an encoded image input from an input unit (not illustrated). As a result, the variable length decoding unit 901 outputs code information on a prediction residual signal to the prediction residual decoder 908, and outputs the other information to the mode decoder 902.

For each of the processing target CUs described in FIG. 5, the mode decoder 902 determines, from the code information received from the variable length decoding unit 901, which of an inter-prediction and an intra-prediction is applied to the processing target CU. When the mode decoder 902 has determined that the inter-prediction is applied to a current processing target CU, the mode decoder 902 decodes information on a motion vector from the code information received from the variable length decoding unit 901, and inputs the decoded information on a motion vector to the motion compensation unit 906 so as to operate the motion compensation unit 906. When the mode decoder 902 has determined that the intra-prediction is applied to the current processing target CU, the mode decoder 902 decodes information on an intra-prediction mode from the code information received from the variable length decoding unit 901, and inputs the decoded information on an intra-prediction mode to the adjacent-pixel-line extension unit 903 so as to operate the adjacent-pixel-line extension unit 903, the prediction direction determination unit 904, and the intra-prediction unit 905.

As described above, when the mode decoder 902 has determined that the inter-prediction has been applied to the current processing target CU, the motion compensation unit 906 operates. First, the motion compensation unit 906 decodes a motion vector from the received encoded image for each processing target PU obtained by dividing the processing target CU, and performs a motion compensation according to the motion vector. The motion compensation unit 906 reads a reference image read from the frame memory 911, cuts a processing target CU out of the reference image, and cuts a reference image PU out of the processing target CU, the reference image PU corresponding to a processing target PU obtained by dividing the processing target CU. The motion compensation unit 906 applies the decoded motion vector to the reference image PU. Accordingly, the motion compensation unit 906 generates a prediction image PU corresponding to a current processing target PU and determines the prediction image PU to be a prediction image PU on which the inter-prediction has been performed. The motion compensation unit 906 combines all of the prediction image PUs of the entire processing target CU, so as to generate a prediction image CU obtained by performing the inter-prediction on the processing target CU and to output the prediction image CU, each prediction image PU being obtained by performing the inter-prediction for each processing target PU.

On the other hand, as described above, when the variable length decoding unit 901 has determined that the intra-prediction has been applied to the current processing target CU, the adjacent-pixel-line extension unit 903, the prediction direction determination unit 904, and the intra-prediction unit 905 operate.

First, the adjacent-pixel-line extension unit 903 performs an operation similar to the operation performed by the adjacent-pixel-line extension unit 601 of FIG. 6. When a processing target PU obtained by dividing a processing target CU is a rectangular block, the adjacent-pixel-line extension unit 903 performs the following processing. When the rectangular block has a horizontally long shape, the adjacent-pixel-line extension unit 903 extends a line of upper adjacent pixels of the rectangular block up to a pixel included in an upper block that is adjacent to an extension obtained by extending a long side of the rectangular block in a horizontally right direction (refer to the description of FIG. 4). When the rectangular block has a vertically long shape, the adjacent-pixel-line extension unit 903 extends a line of left adjacent pixels of the rectangular block up to a pixel included in a left block that is adjacent to an extension obtained by extending a long side of the rectangular block in a vertically downward direction. As an adjacent pixel value, the adjacent-pixel-line extension unit 903 uses a value of a pixel in a corresponding position of the decoded reference image read from the frame memory 911.

Next, the prediction direction determination unit 904 receives an input of information on a decoded intra-prediction mode from the mode decoder 902 via the adjacent-pixel-line extension unit 903, the decoded intra-prediction mode corresponding to a current processing target PU obtained by dividing the processing target CU. When the processing target PU is a rectangular block, the prediction direction determination unit 904 performs the operations of Steps 1, 2, and 3 described in FIG. 4 using the adjacent pixel value set by the adjacent-pixel-line extension unit 903, so as to select one of an original prediction direction corresponding to the decoded prediction mode and its opposite prediction direction.

The intra-prediction unit 905 refers to an adjacent pixel in an intra-prediction direction based on the determination performed by the prediction direction determination unit 904 with respect to the decoded intra-prediction mode described above. Next, the intra-prediction unit 905 determines a prediction value of each prediction target pixel of the processing target PU from the adjacent pixel to which the intra-prediction unit 905 referred, and generates a prediction image PU. The intra-prediction unit 905 combines all of the prediction image PUs of the entire processing target CU, so as to generate a prediction image CU obtained by performing an intra-prediction on the processing target CU and to output the prediction image CU, each prediction image PU being obtained by performing an intra-prediction for each processing target PU.

The prediction image generator 907 outputs the prediction image CU input from the motion compensation unit 906 or the intra-prediction unit 905 to the decoded image calculator 910.

The prediction residual decoder 908 decodes a prediction residual signal from the encoded information input from the variable length decoding unit 901, and outputs the decoded prediction residual signal to the inverse quantization/inverse orthogonal transform unit 909.

The inverse quantization/inverse orthogonal transform unit 909 performs, for each TU obtained by dividing the processing target CU (refer to FIG. 5), an inverse quantization on the prediction residual signal in the spatial frequency domain that is input from the prediction residual decoder 908, and further performs an inverse orthogonal transform on a frequency component on which an inverse quantization has been performed, so as to transform the frequency component into a decoded prediction residual image.

The decoded image calculator 910 combines the decoded prediction residual image TUs for each processing target CU (hereinafter referred to as a "prediction residual image CU"), and adds each pixel in the prediction residual image CU to a corresponding pixel in the prediction image CU input from the prediction image generator 608. As a result, the decoded image calculator 910 decodes a decoded image for each CU (hereinafter referred to as a "decoded image CU"), and further combines the decoded image CUs into one frame image, so as to output the frame image as a decoded frame image and to accumulate the decoded frame images in the frame memory 911 as decoded reference images.

FIG. 10 is a flowchart that illustrates an example of decoding processing that is focused on an intra-prediction and is performed by the video decoding device 900 of FIG. 9. The flowchart is described below referring to each component of FIG. 9 as needed.

First, the adjacent-pixel-line extension unit 903 determines whether the mode decoder 902 has determined that an intra-prediction has been applied to a current processing target CU, and determines whether a current processing target PU obtained by dividing the processing target CU is a rectangular division PU or not (a square division PU) (Step S1001). When a conventional coding scheme before HEVC is applied, or when all of the units on which an intra-prediction is to be performed have a square shape even if the QTBT block partitioning is used, it is determined to be NO.

When it has been determined to be YES in Step S1001, the adjacent-pixel-line extension unit 903 performs the above-described processing of extending a line of adjacent pixels (Step S1002).

Next, with respect to a decoded intra-prediction mode input from the mode decoder 902, the prediction direction determination unit 904 determines whether it is possible to use an opposite prediction direction (abbreviated to "opposite direction" in FIG. 10) that is opposite to an original prediction direction that corresponds to the intra-prediction mode. It will be determined to be YES if all of the following conditions are satisfied: an intra-prediction mode is applied to a processing target PU and a rectangular block is selected as the processing target PU (it is determined to be YES in Step S1001); the decoded intra-prediction mode is one of the intra-prediction modes with mode No. 2 to mode No. 9 and mode No. 33 to mode No. 27 described in FIG. 4; and an adjacent pixel can be set in a pixel position in an opposite prediction direction due to extension processing being performed by the adjacent-pixel-line extension unit 903 (that is, the pixel position is within an original image), the opposite prediction direction being opposite to an original prediction direction that corresponds to the decoded intra-prediction mode.

When it has been determined to be YES in Step S1003, the prediction direction determination unit 904 performs the operation of Step 1 described in FIG. 4. Accordingly, the prediction direction determination unit 904 calculates a distance between a prediction target pixel in the processing target PU and an adjacent pixel in the original prediction direction, and a distance between the prediction target pixel in the processing target PU and an adjacent pixel in the opposite prediction direction (Steps S1004, S1005). These processes are similar to the processes of Steps 705 and 706 of FIG. 7 performed in the video encoding device 600 of FIG. 6. A sum of distances between all of the prediction target pixels in the processing target PU and respective adjacent pixels in the original prediction direction, and a sum of distances between all of the prediction target pixels in the processing target PU and respective adjacent pixels in the opposite prediction direction are calculated as the above-described distances (refer to the description of FIG. 8). Further, as described above, a sum of distances between prediction target pixels on the upper left corner and on the lower right corner in a processing target PU and respective adjacent pixels in the original prediction direction, and a sum of distances between the prediction target pixels on the upper left corner and on the lower right corner in the processing target PU and respective adjacent pixels in the opposite prediction direction may be calculated as the distances calculated in Steps S1004 and S1005. Furthermore, as described above, a distance between a prediction target pixel on the lower right corner in a processing target PU and a respective adjacent pixel in the original prediction direction, and a distance between the prediction target pixel on the lower right corner in the processing target PU and a respective adjacent pixel in the opposite prediction direction may be calculated as the distances calculated in Steps S1004 and S1005. However, there is a need to apply distance-calculation criteria similar to those applied to the processes of Steps S705 and S706 in FIG. 7 performed in the video encoding device 600 of FIG. 6.

Next, the prediction direction determination unit 904 determines whether the sum of distances corresponding to the opposite prediction direction that is calculated in Step S1005 is smaller than the sum of distances corresponding to the original prediction direction that is calculated in Step S1004 (Step S1006). The determination is similar to that performed in Step S707 of FIG. 7.

When it has been determined to be YES in Step S1006, the intra-prediction unit 905 of FIG. 9 refers to an adjacent pixel in the opposite prediction direction that is opposite to the original prediction direction of the decoded intra-prediction mode. Then, according to the adjacent pixel to which the intra-prediction unit 905 referred, the intra-prediction unit 905 determines a prediction value of each prediction target pixel in the processing target PU, so as to generate a prediction target image PU (Step S1007).

When it has been determined to be NO in Step S1006, or when it has been determined to be NO in Step S1003 described above because it is not possible to use the opposite prediction direction that is opposite to the original prediction direction of the decoded intra-prediction mode, the intra-prediction unit 905 performs the process of Step S1008.

Alternatively, the intra-prediction unit 905 also performs the process of Step S1008 when an intra-prediction mode is not applied to the processing target PU or when the processing target PU is not a rectangular block and it has been determined to be NO in Step S1001 described above. In Step S1008, the intra-prediction unit 905 refers to an adjacent pixel in the original prediction direction of the decoded intra-prediction mode. Then, according to the adjacent pixel to which the intra-prediction unit 905 referred, the intra-prediction unit 905 determines a prediction value of each prediction target pixel in the processing target PU, so as to generate a prediction target image PU (Step S1008).

Next, a controller (not illustrated) determines whether a series of processes including Steps S1001 to S1008 described above has been performed on all of the processing target PUs obtained by dividing the processing target CU (refer to FIG. 5) (Step S1009).

When it has been determined to be NO in Step S1009, the process returns to Step S1001, and the series of processes including Steps S1001 to S1008 is performed on a next processing target PU in the processing target CU.

When it has been determined to be YES in Step S1009, the generation of a prediction image PU obtained by performing an intra-prediction that uses the decoded intra-prediction mode has been completed with respect to all of the processing target PUs in the processing target CU, and a prediction image CU that corresponds to the current CU is determined.

Then, block decoding processing is performed on the processing target CU (Step S1010). In Step S1010, the block decoding processing is performed by the prediction residual decoder 908, the inverse quantization/inverse orthogonal transform unit 909, and the decoded image calculator 910 for each TU obtained by dividing the processing target CU. As a result, the decoded image calculator 910 decodes a decoded image CU that corresponds to the processing target CU, and further combines the decoded image CUs into one frame image, so as to output the frame image as a decoded frame image and to accumulate the decoded frame images in the frame memory 911 as decoded reference images.

When the series of processes in Step S1010 described above has been completed, the decoding processing in the flowchart of FIG. 10 that is performed by the video decoding device 900 of FIG. 9 is terminated.

FIG. 11 is an example of a hardware configuration of a computer that can be implemented as the video encoding device 600 of FIG. 6 or the video decoding device 900 of FIG. 9.

The computer illustrated in FIG. 11 includes a central processing unit (CPU) 1101, a memory 1102, an input device 1103, an output device 1104, an auxiliary storage 1105, a medium driving device 1106 into which a portable recording medium 1109 is inserted, and a network connecting device 1107. These components are connected to one another via a bus 1108. The configuration illustrated in FIG. 11 is an example of a configuration of a computer that can be implemented as the video encoding device 600 or the video decoding device 900 described above, and such a computer is not limited to this configuration.

The memory 1102 is, for example, a semiconductor memory such as a read only memory (ROM), a random access memory (RAM), or a flash memory, and stores a program and data used to perform processing.

For example, the CPU 1101 (a processor) operates as each function illustrated in FIG. 6 or 9 by executing a program by use of the memory 1102, the program corresponding to, for example, the processing in the flowchart of FIG. 7 applied to the video encoding device 600 of FIG. 6 or corresponding to, for example, the processing in the flowchart of FIG. 10 applied to the video decoding device 900 of FIG. 9.

The input device 1103 is, for example, a keyboard or a pointing device, and is used for inputting instructions or information from an operator or a user. The output device 1104 is, for example, a display, a printer, or a speaker, and is used for outputting inquiries to the operator or the user or for outputting a result of processing.

The auxiliary storage 1105 is, for example, a hard disk storage, a magnetic disk device, an optical disk device, a magneto-optical disk device, a tape device, or a semiconductor storage device. The video encoding device 600 of FIG. 6 or the video decoding device 900 of FIG. 9 stores, in the auxiliary storage 1105, a program and data so as to load them into the memory 1102 and use them, the program and the data being used to execute, for example, the processing in the flowchart of FIG. 7 applied to the video encoding device 600 of FIG. 6 or being used to execute, for example, the processing in the flowchart of FIG. 10 applied to the video decoding device 900 of FIG. 9.

The medium driving device 1106 drives the portable recording medium 1109 so as to access the recorded content. The portable recording medium 1109 is, for example, a memory device, a flexible disk, an optical disk, or a magneto-optical disk. The portable recording medium 1109 may be, for example, a compact disk read only memory (CD-ROM), a digital versatile disk (DVD), or a universal serial bus (USB) memory. The operator or the user can store the program and the data described above in the portable recording medium 1109 so as to load them into the memory 1102 and use them.

As described above, a computer-readable recording medium that stores therein the program and the data described above is a physical (non-transitory) recording medium such as the memory 1102, the auxiliary storage 1105, or the portable recording medium 1109.

The network connecting device 1107 is a communication interface that is connected to a communication network such as a local area network (LAN) and makes a data conversion associated with communication. The video encoding device 600 of FIG. 6 or the video decoding device 900 of FIG. 9 can also receive the program or the data described above from an external device via the network connecting device 1107 so as to load them into the memory 1102 and use them.

The video encoding device 600 of FIG. 6 or the video decoding device 900 of FIG. 9 does not necessarily include all of the components in FIG. 11, and some of the components can be omitted according to the applications or the requirements. For example, when there is no need to input instructions or information from the operator or the user, the input device 1103 may be omitted. When the portable recording medium 1109 or the communication network is not used, the medium driving device 1106 or the network connecting device 1107 may be omitted.

In the embodiments described above, when a processing target block has a non-square shape, it is determined which of an intra-prediction in an original prediction direction and an intra-prediction in an opposite prediction direction makes it possible to perform an intra-prediction from a closer prediction image, so as to realize an intra-prediction without increasing the number of prediction modes. This results in being able to perform encoding more efficiently with respect to an intra-prediction performed on a rectangular block.

In the embodiments described above, a prediction direction that is opposite to an original prediction direction is a determination target prediction direction, but it is not limited to the opposite direction. Depending on a method for obtaining a prediction pixel that is used to generate a prediction pixel (a method defined by, for example, a standard), a direction that corresponds to an angle of approximately 180 degrees, not exactly 180 degrees may be a determination target prediction direction.

Further, if the conditions are satisfied, the number of intra-prediction modes corresponding to an opposite prediction direction may be increased so as to encode information on an added intra-prediction mode.

The embodiments of the present invention described above are applied to processing of encoding and decoding a video, but they are also applicable to a still image.

The disclosed embodiments and their advantages have been described in detail, but various modifications, additions, and omissions may be made by persons skilled in the art without departing from the scope of the invention specified in the claims.

All examples and conditional language provided herein are intended for pedagogical purposes to aiding the reader in understanding the invention and the concepts contributed by the inventor to further the art, and are not to be construed as being limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An image encoding apparatus for performing an intra-prediction that is associated with a prediction mode when image encoding is performed, the image encoding apparatus comprising:
    a determination unit configured to determine whether a processing target unit on which the intra-prediction is performed has a rectangular shape;
    a selection unit configured, when performing the intra-prediction for a first mode number associated with a first prediction mode corresponding to the processing target unit and indicating the first prediction mode from a first prediction direction, and when having determined that a shape of the processing target unit is a rectangular shape, to determine whether the first mode number for the first prediction mode from the first prediction direction included in a predetermined range, to determine to be able to use a second mode number indicating a second prediction mode from a second prediction direction opposite to the first prediction direction when the first mode number is in the predetermined range, to determine to use the first mode number when not included in the predetermined range, and to select one of the first mode number and the second mode number based on what has been determined;
    an intra-prediction unit configured to perform the intra-prediction for the one of the first mode number and the second mode number selected; and
    an encoding processing unit configured to encode information of the first prediction mode associated with the first prediction direction even when the second mode number is selected.

2. The image encoding apparatus according to claim 1, wherein when the intra-prediction from the second prediction direction is available and calculation of the intra-prediction is possible from the second prediction direction, the selection unit selects the one of the first mode number and the second mode number.

3. An image encoding method for performing an intra-prediction that is associated with a prediction mode when image encoding is performed, the image encoding method comprising:

determining whether a processing target unit on which the intra-prediction is performed has a rectangular shape;

when performing the intra-prediction for a first mode number associated with a first prediction mode corresponding to the processing target unit and indicating the first prediction mode from a first prediction direction, and when having determined that a shape of the processing target unit is a rectangular shape, determining whether the first mode number for the first prediction mode from the first prediction direction included in a predetermined range, determining to be able to use a second mode number indicating a second prediction mode from a second prediction direction opposite to the first prediction direction of when the first mode number is included in the predetermined range, determining to use the first mode number when the first mode number is not included in the predetermined range, and selecting one of the first mode number and the second mode number based on what has been determined;

performing the intra-prediction for the one of the first mode number and the second mode number selected; and encoding information of the prediction mode associated with the first prediction direction even when the second mode number is selected.

4. The image encoding method according to claim 3, wherein when the intra-prediction from the second prediction direction is available and calculation of the intra-prediction is possible from the second prediction direction, the selecting of the one of the first mode number and the second mode number is performed.

5. An image decoding apparatus for performing an intra-prediction that is associated with a prediction mode when image decoding is performed, the image decoding apparatus comprising:

a determination unit configured to determine whether a processing target unit on which the intra-prediction is performed has a rectangular shape;

a selection unit configured, when performing the intra-prediction for a first mode number associated with a first prediction mode corresponding to the processing target unit and indicating the first prediction mode from a first prediction direction, and when having determined that a shape of the processing target unit is a rectangular shape, to determine whether the first mode number for the first prediction mode from the first prediction direction included in a predetermined range, to determine to be able to use a second mode number indicating a second prediction mode from a second prediction direction opposite to the first prediction direction when the first mode number is included in the predetermined range, to determine to use the first mode number when the first mode number is not included in the predetermined range, and to select one of the first mode number and the second mode number based on what has been determined; and an intra-prediction unit configured to perform the intra-prediction for the one of the first mode number and the second mode number selected.

6. The image decoding apparatus according to claim 5, wherein when the intra-prediction from the second prediction direction is available and calculation of the intra-prediction is possible from the second prediction direction, the selection unit selects the one of the first mode number and the second mode number.

7. An image decoding method for performing an intra-prediction that is associated with a prediction mode when image decoding is performed, the image decoding method comprising:

determining whether a processing target unit on which the intra-prediction is performed has a rectangular shape;

determining an intra-prediction mode number when the rectangular shape is determined for the processing target unit, wherein the intra-prediction mode number is one of a first mode number associated with a first prediction mode from a first prediction direction and a second mode number associated with a second prediction mode from a second prediction direction opposite to the first prediction direction, and the second mode number is available as the intra- prediction mode number when the intra-prediction mode number is included in a predetermined range; and performing the intra-prediction for the intra-prediction mode number.

* * * * *